US012263679B2

(12) United States Patent
Morgan et al.

(10) Patent No.: US 12,263,679 B2
(45) Date of Patent: Apr. 1, 2025

(54) DROPLET DEPOSITION APPARATUS AND METHODS FOR DETERMINING MISALIGNMENT THEREOF

(71) Applicant: Xaar Technology Limited, Huntingdon (GB)

(72) Inventors: Alan Morgan, Huntingdon (GB); Jesus Garcia Maza, Huntingdon (GB); Kevin Gallon, Huntingdon (GB)

(73) Assignee: Xaar Technology Limited, Huntingdon (GB)

( * ) Notice: Subject to any disclaimer, the term of this patent is extended or adjusted under 35 U.S.C. 154(b) by 257 days.

(21) Appl. No.: 17/921,927

(22) PCT Filed: Apr. 27, 2021

(86) PCT No.: PCT/GB2021/051014
§ 371 (c)(1),
(2) Date: Oct. 27, 2022

(87) PCT Pub. No.: WO2021/219989
PCT Pub. Date: Nov. 4, 2021

(65) Prior Publication Data
US 2023/0166508 A1 Jun. 1, 2023

(30) Foreign Application Priority Data
Apr. 28, 2020 (GB) ...................................... 2006217

(51) Int. Cl.
*B41J 2/145* (2006.01)
*B41J 2/045* (2006.01)
(Continued)

(52) U.S. Cl.
CPC ........... *B41J 2/145* (2013.01); *B41J 2/04505* (2013.01); *B41J 2/155* (2013.01); *B41J 2/2132* (2013.01);
(Continued)

(58) Field of Classification Search
CPC ........ B41J 2/145; B41J 2203/01; B41J 2/155; B41J 2/2132; B41J 2/2146; B41J 3/543;
(Continued)

(56) References Cited

U.S. PATENT DOCUMENTS 5,751,311 A 5/1998 Drake
5,886,726 A 3/1999 Pawelka et al.
(Continued)

FOREIGN PATENT DOCUMENTS

EP 1375146 A1 1/2004
EP 1765595 B1 3/2007
(Continued)

OTHER PUBLICATIONS

"Pixel drift compensation using internal Vernier redundancy", anonymous, Research Disclosure, Kenneth Mason Publications, vol. 655, No. 1, Nov. 10, 2018, p. 1149.

*Primary Examiner* — Yaovi M Ameh
(74) *Attorney, Agent, or Firm* — Honigman LLP; Eric J. Sosenko; Jonathan P. O'Brien

(57) ABSTRACT

A droplet deposition apparatus (1) comprising: a first head module (101A, 101B, 102A) and a second head module (101B, 102A, 102B) arranged in at least partially overlapping relationship, each head module having a plurality of nozzles in at least one nozzle array (A1, B1); and a storage (200) configured to store a table of determined best aligned nozzle pairs in an overlap region and corresponding skew angles (Θi) of at least one of the head modules relative to a datum of the droplet deposition apparatus and/or a corresponding positional offset of the second head module relative to the first head module; wherein, in the overlap region, nozzles of the first head module are arranged at a first nozzle pitch (P2) and nozzles of the second head module are arranged at a second nozzle itch (P3). Associated methods in respect of determining misalignment information in respect
(Continued)

of such a droplet deposition apparatus, and determining one or more best aligned nozzle pairs in an overlap region between at least two head modules, are also provided.

18 Claims, 24 Drawing Sheets

(51) Int. Cl.

| | |
|---|---|
| ***B41J 2/155*** | (2006.01) |
| ***B41J 2/21*** | (2006.01) |
| ***B41J 3/54*** | (2006.01) |
| ***B41J 11/00*** | (2006.01) |
| ***B41J 25/00*** | (2006.01) |
| ***B41J 29/393*** | (2006.01) |

(52) U.S. Cl.
CPC ........... *B41J 2/2135* (2013.01); *B41J 2/2146* (2013.01); *B41J 3/543* (2013.01); *B41J 11/008* (2013.01); *B41J 25/003* (2013.01); *B41J 29/393* (2013.01); *B41J 25/001* (2013.01); *B41J 2029/3935* (2013.01); *B41J 2202/21* (2013.01); *B41J 2203/01* (2020.08)

(58) Field of Classification Search
CPC ...... B41J 11/008; B41J 29/393; B41J 25/001; B41J 2029/3935; B41J 2202/21; B41J 25/003; B41J 2/04505; B41J 2/2135
See application file for complete search history.

(56) References Cited

U.S. PATENT DOCUMENTS

| | | | | |
|---|---|---|---|---|
| 6,109,722 | A | 8/2000 | Underwood et al. | |
| 6,219,153 | B1 | 4/2001 | Kawanabe et al. | |
| 6,347,856 | B1 | 2/2002 | Arquilevich et al. | |
| 6,350,004 | B1 | 2/2002 | Askren | |
| 6,394,579 | B1 | 5/2002 | Boyd et al. | |
| 6,764,164 | B2 | 7/2004 | Kuwahara | |
| 6,773,089 | B2 | 8/2004 | Inoue et al. | |
| 6,847,465 | B1 | 1/2005 | Wetchler et al. | |
| 7,264,324 | B2 | 9/2007 | Kovacs | |
| 7,296,878 | B2 | 11/2007 | Kusakari | |
| 7,374,265 | B2 | 5/2008 | Yamane et al. | |
| 7,419,230 | B2 | 9/2008 | Tatsuta et al. | |
| 7,758,143 | B2 | 7/2010 | Silverbrook et al. | |
| 8,123,323 | B2 | 2/2012 | Jung | |
| 8,393,709 | B2 | 3/2013 | Enge | |
| 8,529,014 | B2 | 9/2013 | Profaca et al. | |
| 8,807,691 | B2 | 8/2014 | Chandu et al. | |
| 8,870,338 | B2 | 10/2014 | Kyoso et al. | |
| 9,081,519 | B2 | 7/2015 | Moreau et al. | |
| 9,533,513 | B1 | 1/2017 | Qian | |
| 9,764,576 | B2 | 9/2017 | Bogart | |
| 9,956,799 | B1 | 5/2018 | Manchester et al. | |
| 10,185,900 | B2 | 1/2019 | Casaldaliga Albisu et al. | |
| 2002/0145640 | A1 | 10/2002 | Anderson et al. | |
| 2003/0011792 | A1 | 1/2003 | Noyes et al. | |
| 2003/0146952 | A1 | 8/2003 | Numata et al. | |
| 2007/0008359 | A1 | 1/2007 | Suzuki et al. | |
| 2008/0158295 | A1 * | 7/2008 | Suzuki | B41J 2/155 347/42 |
| 2009/0051717 | A1 | 2/2009 | Kuwahara | |
| 2010/0026747 | A1 | 2/2010 | Miyamoto et al. | |
| 2014/0071201 | A1 | 3/2014 | Lieberman et al. | |
| 2016/0221373 | A1 * | 8/2016 | Nishikawa | B41J 2/51 |

FOREIGN PATENT DOCUMENTS

| | | | | | |
|---|---|---|---|---|---|
| EP | 2639069 | A1 | | 9/2013 | |
| EP | 2979881 | A1 | | 2/2016 | |
| EP | 3539784 | A1 | | 9/2019 | |
| IT | UA20 163 132 | A1 | | 11/2017 | |
| JP | 2000190484 | A | * | 7/2000 | B41J 2/045 |
| JP | 2015030166 | A | | 2/2015 | |
| JP | 6062702 | B2 | | 1/2017 | |
| WO | 2014192463 | A1 | | 12/2014 | |
| WO | 2018025003 | A1 | | 2/2018 | |

* cited by examiner

| | Aligned nozzle pair | |
|---|---|---|
| Skew angle of head 101 with respect to head mounting system $\theta_1$ (°) | Nozzle number of module 101A | Nozzle number of module 101B |
| -0.05 | 1411 | 1467 |
| -0.04 | 1407 | 1463 |
| -0.03 | 1403 | 1459 |
| -0.02 | 1399 | 1455 |
| -0.01 | 1396 | 1452 |
| 0 | 1392 | 1448 |
| 0.01 | 1388 | 1444 |
| 0.02 | 1385 | 1441 |
| 0.03 | 1381 | 1437 |
| 0.04 | 1377 | 1433 |
| 0.05 | 1374 | 1430 |

Figure 8

| Aligned nozzle pair | | |
|---|---|---|
| Nozzle number of module 101A | Nozzle number of module 101B | Total skew angle of slot in which head 101 is mounted in apparatus $\Theta(\Theta1+\Theta4)$(°) |
| 1411 | 1467 | -0.05 |
| 1407 | 1463 | -0.04 |
| 1403 | 1459 | -0.03 |
| 1399 | 1455 | -0.02 |
| 1396 | 1452 | -0.01 |
| 1392 | 1448 | 0 |
| 1388 | 1444 | 0.01 |
| 1385 | 1441 | 0.02 |
| 1381 | 1437 | 0.03 |
| 1377 | 1433 | 0.04 |
| 1374 | 1430 | 0.05 |

Figure 20

DROPLET DEPOSITION APPARATUS AND METHODS FOR DETERMINING MISALIGNMENT THEREOF

FIELD OF INVENTION

The present disclosure relates to an apparatus for droplet deposition. More particularly, the disclosure relates to an apparatus and methods for improving print quality by determining misalignment between various components in a droplet deposition apparatus.

BACKGROUND

A droplet deposition apparatus, such as an inkjet printer, prints dots by ejecting small droplets of fluid (e.g. ink) onto a print media. Such a droplet deposition apparatus typically comprises at least one droplet deposition head having a nozzle array. The nozzle array comprises a plurality of nozzles, where each nozzle is configured to eject droplets of fluid (e.g. ink) in response to a signal received from control circuitry, to reproduce an image on the print media.

A droplet deposition apparatus comprising a plurality of nozzle arrays (which may be arranged together to form individual droplet deposition head(s), and/or may be arranged as separate droplet deposition heads or head modules), is usually fabricated such that the nozzle arrays are arranged in parallel but offset from each other such that they overlap along a media feed axis (or in the print direction). This enables the nozzle arrays to cover, in combination, a width of the print media that is larger than each individual array, and in some cases the entire width of the print media. However, such arrangements often suffer from alignment problems that result in a visible fault or artefact in the printed image in the overlap region of the arrays. The visible fault typically presents itself as a light or dark band in the printed image, which is noticeable to the human eye. This problem has been addressed using mechanical alignment methods and by attempting to maintain tight manufacturing tolerances to keep misalignments within an acceptable range. However, it is time-consuming and expensive to mechanically align nozzle arrays located within the same droplet deposition head, or located in head modules or heads mounted adjacent one another within a droplet deposition apparatus, to such a degree of accuracy that limits the misalignment to an acceptable level and reduces or avoids visible faults in the printed image.

Therefore, there is a need for an improved technique to reduce or avoid the visible faults that arise when adjacent nozzle arrays are misaligned.

SUMMARY

Aspects of the invention are set out in the appended independent claims, while particular embodiments of the invention are set out in the appended dependent claims.

The following disclosure describes, according to a first aspect of the invention, a droplet deposition apparatus comprising: a first head module and a second head module arranged in at least partially overlapping relationship, each head module having a plurality of nozzles in at least one nozzle array; and a storage configured to store a table of determined best aligned nozzle pairs in an overlap region and corresponding skew angles of at least one of the head modules relative to a datum of the droplet deposition apparatus and/or a corresponding positional offset of the second head module relative to the first head module; wherein, in the overlap region, nozzles of the first head module are arranged at a first nozzle pitch and nozzles of the second head module are arranged at a second nozzle pitch.

According to a second aspect of the invention, there is provided a droplet deposition apparatus comprising: a droplet deposition head comprising a first head module and a second head module arranged in at least partially overlapping relationship, each head module having a plurality of nozzles in at least one nozzle array; and a storage configured to store a table of determined best aligned nozzle pairs in an overlap region and corresponding skew angles of the droplet deposition head relative to a datum of the droplet deposition apparatus and/or a corresponding positional offset of the droplet deposition head; wherein, in the overlap region, nozzles of the first head module are arranged at a first nozzle pitch and nozzles of the second head module are arranged at a second nozzle pitch.

According to a third aspect of the invention, there is provided a droplet deposition apparatus comprising: a first head module and a second head module arranged in at least partially overlapping relationship, each head module having a plurality of nozzles in at least one nozzle array, and wherein, in an overlap region, nozzles of the first head module are arranged at a first nozzle pitch and nozzles of the second head module are arranged at a second nozzle pitch; and a storage configured to store actual positions and/or error in positions of two or more head modules in the droplet deposition apparatus; wherein the error in position is a difference between an ideal position of the head module and the actual position of that head module.

According to a fourth aspect of the invention, there is provided a method for determining misalignment information in respect of a droplet deposition apparatus according to the first aspect of the invention. The method comprises the steps of: determining one or more best aligned nozzle pairs in an overlap region of the nozzle array of the first head module and the nozzle array of the second head module, for a plurality of skew angles of at least one of the head modules relative to a datum of the droplet deposition apparatus and/or for a plurality of positional offsets of the second head module relative to the first head module; and storing a table of determined best aligned nozzle pairs and corresponding skew angles and/or corresponding positional offset in the storage.

According to a fifth aspect of the invention, there is provided a method for determining misalignment information in respect of a droplet deposition apparatus according to the second aspect of the invention. The method comprises the steps of: determining one or more best aligned nozzle pairs in an overlap region of the nozzle array of the first head module and the nozzle array of the second head module, for a plurality of skew angles of the droplet deposition head relative to a datum of the droplet deposition apparatus and/or for a plurality of positional offsets of the droplet deposition head; and storing a table of determined best aligned nozzle pairs and corresponding skew angles and/or corresponding positional offset in the storage.

According to a sixth aspect of the invention, there is provided a method for determining misalignment information in respect of a droplet deposition apparatus according to the third aspect of the invention. The method comprises the step of: storing actual positions and/or error in positions of two or more head modules in the droplet deposition apparatus, in the storage.

According to a seventh aspect of the invention, there is provided a method for determining one or more best aligned nozzle pairs in an overlap region between at least two head modules, each head module having a plurality of nozzles in at least one nozzle array, and wherein, in the overlap region, nozzles of the nozzle array of a first head module are arranged at a first nozzle pitch and nozzles of the nozzle array of a second head module are arranged at a second nozzle pitch, the method comprising the steps of: printing a test image via the plurality of nozzles in the overlap region, wherein the test image comprises one or more test patterns for one or more nozzle pairs in the overlap region of nozzle arrays; scanning the printed test image, calculating average colour density across one or more areas of the scanned test image; wherein the scanned test image comprises one or more sections and each section comprises a stitch area forming a transition area from one array to the other within the overlap region, and a non-stitch area which is outside the stitch area; determining a colour density variation across one or more sections of the scanned test image; and determining the one or more best aligned nozzle pairs in the overlap region of nozzle arrays based on the determined colour density variation.

By virtue of the above apparatus and methods, the misalignment within the apparatus can be efficiently determined. Furthermore, when a new head module/head is inserted in the apparatus, or when a head module/head of the apparatus is replaced, fewer process steps and less time will be required for the alignment of the head module/head, thereby increasing the efficiency of the apparatus.

BRIEF DESCRIPTION OF THE DRAWINGS

Reference is now directed to the drawings, in which:

FIG. 8 is an example of a table showing various skew angles of head with respect to a droplet deposition apparatus and corresponding aligned nozzle pairs;

FIG. 20 is an example of a table showing aligned nozzle pairs and corresponding various total skew angles in a droplet deposition apparatus;

In the Figures, like elements are indicated by like reference numerals throughout. It should be noted that the drawings are not to scale and that certain features may be shown with exaggerated sizes so that these are more clearly visible.

DETAILED DESCRIPTION

The apparatus and method of the present disclosure enable improved techniques to reduce or avoid a visible fault which arises when adjacent nozzle arrays are misaligned, by determining and storing at least one best aligned nozzle pair in the apparatus. This saves overall process time and manual adjustment during instalment of, for example, a head module or a droplet deposition head or a printbar in a droplet deposition apparatus.

Reference will now be made in detail to the embodiments, examples of which are illustrated in the accompanying drawings.

Apparatus Overview

A droplet deposition apparatus (e.g. a printer) typically comprises at least one droplet deposition head having at least one head module. The or each head module comprises at least one nozzle array having a plurality of nozzles arranged in one or more rows.

Figure 1:
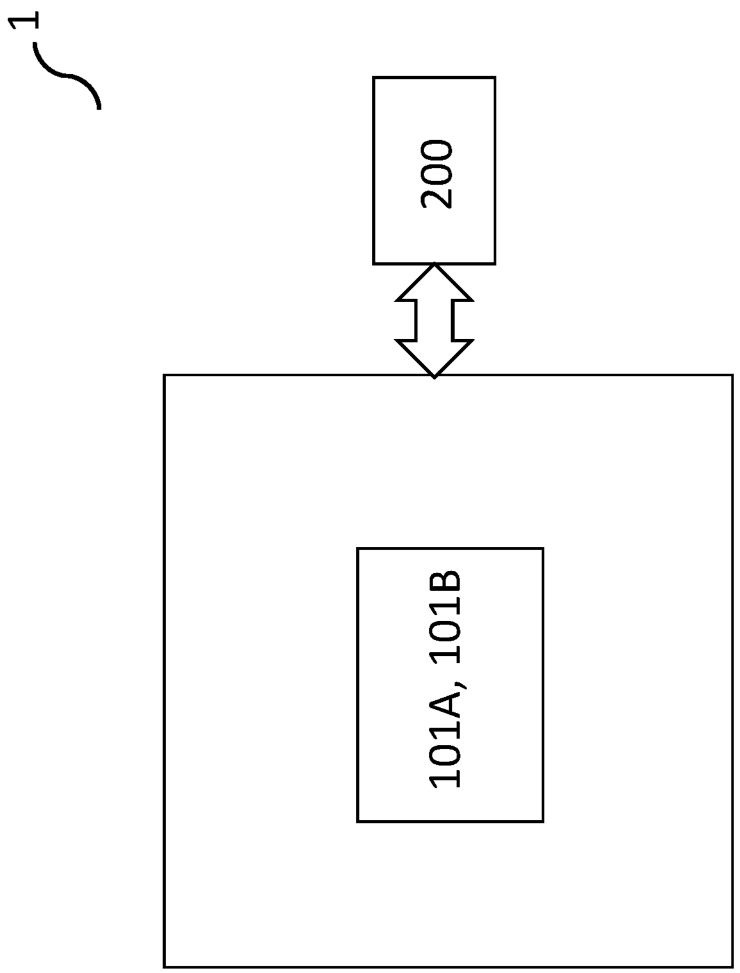
FIG. 1 depicts a block diagram of a droplet deposition apparatus according to the present invention.

FIG. 1 depicts a block diagram of a droplet deposition apparatus according to the present invention. The droplet deposition apparatus 1 comprises a first head module 101A and a second head module 101B arranged in at least partially overlapping relationship in the print direction, each head module having a plurality of nozzles in at least one nozzle array. Furthermore, the droplet deposition apparatus 1 may comprise a first droplet deposition head comprising the first head module 101A and a second droplet deposition head comprising the second head module 101B. Therefore, in this case, the terms "head module" and "head" may be used interchangeably. The nozzle arrays of head modules 101A, 101B may be of the configuration illustrated in FIG. 2 or 3. Further, in the overlap region, nozzles of the first head module 101A are arranged at a first nozzle pitch, and nozzles of the second head module 101B are arranged at a second nozzle pitch. The second portion of the first head module 101A is configured to overlap with the first portion of second head module 101B.

The first head module 101A and the second head module 101B may be arranged in a single droplet deposition head. The droplet deposition apparatus may comprise a plurality of droplet deposition heads. The actual position of each head module within the droplet deposition apparatus or within the droplet deposition head, and/or the actual position of the head modules with respect to each other in each droplet deposition apparatus or in each droplet deposition head, could be approximately the same. However, due to manufacturing variations and misalignments, the actual positions of the head modules could be different. Thus, the apparatus 1 further comprises a storage 200 configured to store the actual positions of two or more head modules within the droplet deposition head or within the droplet deposition apparatus, and/or with respect to another adjacent head module. Further, an error in position of a head module may be calculated from the actual position and an ideal position of the head module, and consequently, in addition to or instead of storing the actual positions, the errors in positions of two or more head modules may be stored in the storage. The error in position is a difference between the ideal position of the head module and the actual position of that head module.

It should be noted that the actual position is the position of a head module after arranging or mounting the head module into the droplet deposition head or droplet deposition apparatus, whereas the ideal position is the position a head module is required to be in the droplet deposition head or droplet deposition apparatus (assuming no manufacturing variations).

The storage 200 is further configured to store a table of determined best aligned nozzle pairs in an overlap region between the nozzle arrays of first head module 101A and the second head module 101B, and corresponding skew angles of at least one of the head modules 101A, 101B or heads 101, 102 relative to a datum of the droplet deposition apparatus 1, and/or a corresponding positional offset of the second head module or the second head relative to the first head module or the first head. It should be noted that when a droplet deposition head comprises two or more head modules, the table in the storage comprises a corresponding skew angle of the head, and/or a corresponding position offset of the head, rather than that of a head module. The datum is a reference point in the droplet deposition apparatus 1 at which the head modules or heads may be mounted. The storage 200 stores at least one best aligned nozzle pair for each skew angle of at least one of the head modules 101A, 101B or heads 101, 102. The best aligned nozzle pair may be calculated based on the actual positions or error in positions of two or more head modules 101A, 101B, or based on the actual position or error in position of the head modules with respect to each other. Moreover, the storage 200 may be configured to store at least two best aligned nozzle pairs for each skew angle of at least one of the head modules 101A, 101B or at least one of the heads 101, 102.

It should be noted that "skew" in this disclosure refers to rotational or angular misalignment whereas "positional offset" refers to parallel offset or parallel misalignment in the cross-print direction.

According to one embodiment of the present invention, the first head module 101A, the second head module 101B and the storage 200 may be separate components, i.e. the storage 200 is not comprised within or located on the head module 101A, 101B but is in communication with the head module 101A, 101B. An externally located storage may be preferable in some situations if, during printing, the storage heats up due to processing of stored data. Thus if the storage is located away from and not in close vicinity of the head module, direct heat impact on the head module due to the storage, and potential resulting interference with the operation of the head module, may be avoided.

Alternatively, according to another embodiment of the present invention, at least one of the head modules 101A, 101B may comprise the storage 200 such that the storage 200 is embedded within the head module 101A, 101B or located on the head module 101A, 101B. Moreover, the storage 200 may be provided in a driver ASIC or processor of the head module 101A, 101B which comprises other electronic components that are necessary for driving the head module 101A, 101B and may be located within or on the head module 101A, 101B. The head module may have a cooling mechanism to cool the storage and/or other electronic components that are mounted on the head module. This embodiment may be advantageous as the head module manufacturer is able to store data related to best aligned nozzle pairs directly on the head module memory, during manufacturing of the head module. This provides quick access to alignment data of each individual head module, thereby reducing overall setting-up time of the head module within a droplet deposition apparatus.

According to other embodiment, a droplet deposition head may comprise two head modules 101A, 101B and the storage 200 may be located on the head or embedded within the head.

Staggered/Overlapping Arrangement of Heads and Head Modules

The droplet deposition apparatus 1 may comprise a plurality of droplet deposition heads, for example such arrays of nozzles of adjacent droplet deposition heads may span a width larger than that of a single droplet deposition head, or even the width of the print media (e.g. for an industrial printer). For example two or more droplet deposition heads, or two or more head modules within a droplet deposition head, may be arranged along an axis of the apparatus in a staggered arrangement, such that adjacent heads or head modules partially overlap with each other in the printing direction 500, as shown in FIGS. 2A and 2B.

Figure 2A:
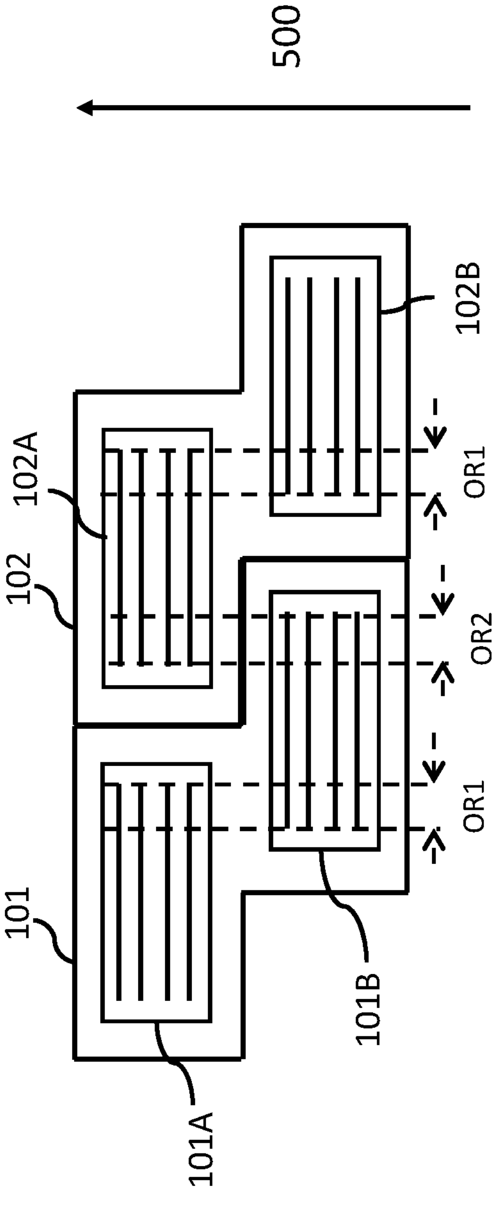
FIG. 2A is a schematic diagram of two partially overlapping and aligned droplet deposition heads, each droplet deposition head having two head modules.

FIG. 2A depicts (in plan view from underneath) a first droplet deposition head 101 and a second droplet deposition head 102 that are partially overlapped with each other in the printing direction 500. The heads 101, 102, each comprise two partially overlapped head modules. As shown in FIG. 2A, the first droplet deposition head 101 comprises a first head module 101A and a second head module 101B that are partially overlapped with each other in the printing direction 500, and the second droplet deposition head 102 comprises a first head module 102A and a second head module 102B that are partially overlapped with each other in the printing direction 500. An overlap region “OR” of the first and the second head modules 101A, 101B, 102A, 102B within each of the droplet deposition heads 101, 102 is shown as “OR1”, whereas an overlap region “OR” of the first head 101 and the second head 102 is shown as “OR2”.

Further, a droplet deposition head may also comprise more than two head modules. FIG. 2B depicts two droplet deposition heads, each comprising four head modules. As shown in FIG. 2B, the first droplet deposition head 101 comprises four head modules 101A, 101B, 101C and 101D, and the second droplet deposition head 102 comprises four head modules 102A, 102B, 102C and 102D. The overlap regions “OR” within each head 101, 102 are depicted as “OR1” and the overlap region of heads 101, 102 is depicted as “OR2”. In FIG. 2B, as each head 101, 102 comprises four head modules, there are three overlap regions “OR1” formed within each head 101, 102. In the first droplet deposition head 101, the head modules are arranged such that a second head module 101B is in the printing direction 500, partially overlapped on a first side with a first head module 101A and partially overlapped on a second side with a third head module 101C. Meanwhile, the third head module 101C is in the printing direction 500, partially overlapped on a first side with the second head module 101B and partially overlapped on a second side with a fourth head module 101D. Similarly, in the second droplet deposition head 102, the head modules are arranged such that a second head module 102B is in the printing direction 500, partially overlapped on a first side with a first head module 102A and partially overlapped on a second side with a third head module 102C. The third head module 102C is in the printing direction 500, partially overlapped on a first side with the second head module 102B and partially overlapped on a second side with a fourth head module 102D.

Figure 2B:
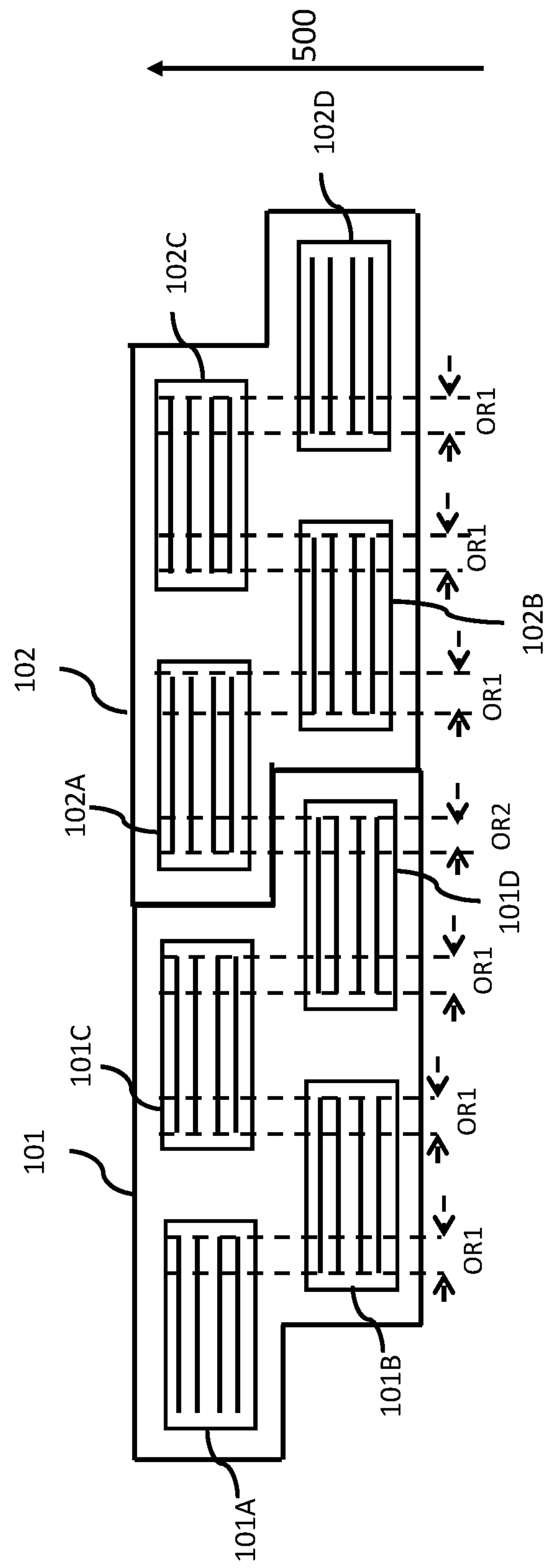
FIG. 2B is a schematic diagram of two partially overlapping and aligned droplet deposition heads, each droplet deposition head having four head modules.

It should be noted that even though FIGS. 2A and 2B depict two and four head modules respectively within the droplet deposition heads, the number of head modules in the droplet deposition head is not limited to two or four and the droplet deposition apparatus may comprise a droplet deposition head having any number of head modules.

Further it should be noted that even if FIGS. 2A and 2B depict the same position of the head modules in heads 101, 102, the actual position of the head modules in each head may not be the same. Also, the area of the overlap region within the heads or between the two or more heads may be different. For example, head module 101A in head 101 may be arranged closer or farther from the edge of the head 101A such that the overlap region “OR1” between the head modules 101A, 101B is narrower or wider than the overlap region “OR1” between the head modules 102A, 102B.

In the overlapping arrangements shown in FIGS. 2A and 2B, some or all of the nozzles of one head or head module are used to print part of an image, and another part of the image is printed using the nozzles of another adjacent head or head module, and so on. In the overlap region of adjacent heads or head modules, the image is printed by transitioning from one head or head module to the adjacent head or head module. The point at which this transition occurs is referred to herein as a “transition point”.

Such a transition in the overlapping region may introduce an inaccuracy or visible artefact at the seams (i.e. at the transition point in the overlap region) between sub-images printed by each one of the droplet deposition heads or head modules if the overlapping nozzle regions are not sufficiently well aligned. For example, the visible artefact may be a darker line or a dark band (where the overlapping nozzles are too close together, i.e. closer together than a nominal nozzle pitch) or a lighter line or a light band (where the overlapping nozzles are too far apart, i.e. further apart than a nominal nozzle pitch).

Different Pitches of Nozzle Arrays

To overcome the above problem, the plurality of nozzles of nozzle arrays of the first head module and the second head module are arranged such that, in the overlap region “OR”, the nozzle pitch (i.e. a centre-to-centre separation between adjacent nozzles along the direction of the array) of the first head module is different than the nozzle pitch of the second head module. The nozzle array of the first head module and the nozzle array of the second head module may each comprise a first portion in which the nozzles are arranged at a first nozzle pitch and a second portion in which the nozzles are arranged at a second nozzle pitch. The second portion of the first head module is configured to overlap with the first portion of the second head module.

Figure 3:
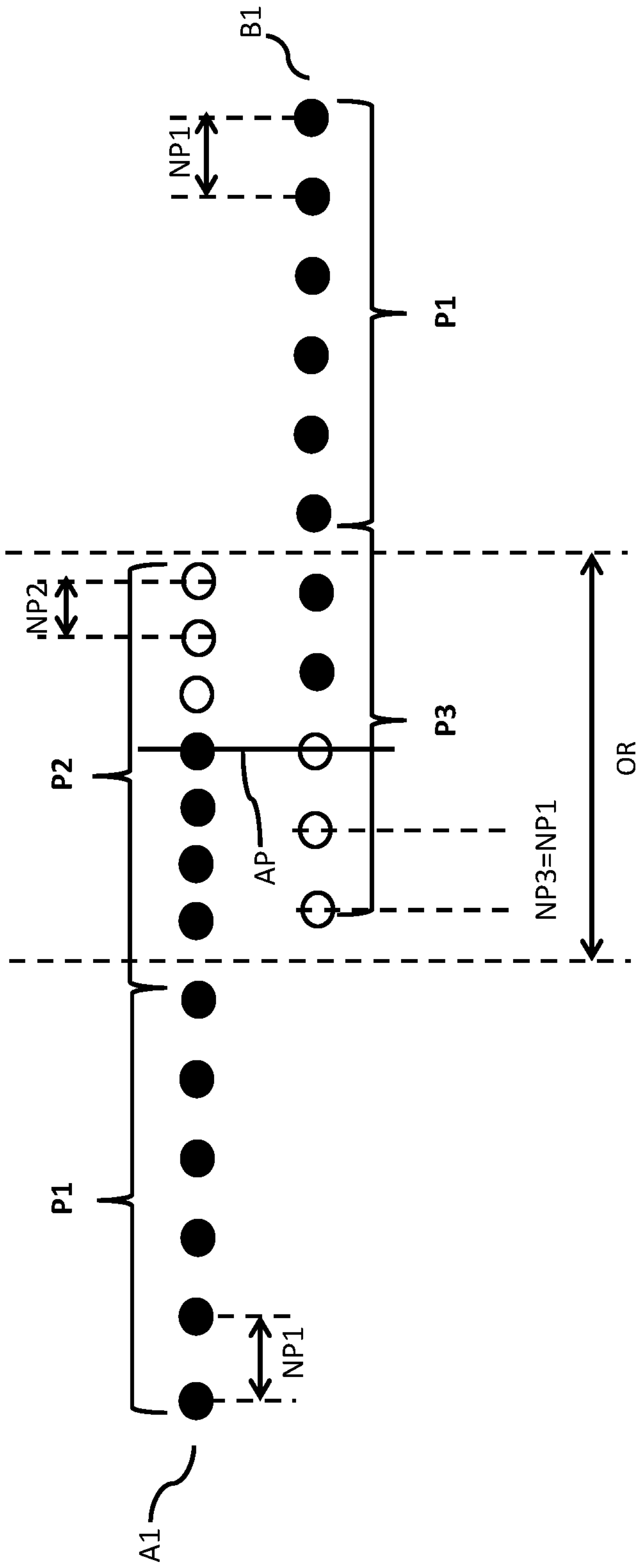
FIG. 3 is a schematic illustration of two partially overlapped nozzle arrays of a first head module and a second head module respectively, each nozzle array comprising a first portion having a first nozzle pitch and a second portion having a second nozzle pitch.

According to one implementation of the present invention, FIG. 3 depicts an arrangement of partially overlapped nozzle arrays with different nozzle pitches. A nozzle array A1 of the first head module 101 is partially overlapped with a nozzle array B1 of the second head module 102 in the printing direction 500. The nozzle array A1 comprises two portions, wherein the first portion P1 has a nozzle pitch NP1 and the second portion P2 has a nozzle pitch NP2 which is different from the nozzle pitch NP1. In other words, each portion of the nozzle array has a different nozzle pitch. The pitch NP2 may be smaller than the pitch NP1 such that NP2<NP1, or the pitch NP2 may be greater than the pitch NP1 such that NP2>NP1. Further, in this example, the nozzle array B1 comprises two portions P1 and P3, the nozzles of which are arranged at nozzle pitches NP1 and NP3 respectively, with nozzle pitch NP3 being the same as nozzle pitch NP1. In other words, in this example, the nozzle pitch of nozzle array B1 is constant, NP1=NP3. In FIG. 3, the portion P2 of nozzle array A1 is overlapped along the printing direction 500 with the portion P3 of nozzle array B1.

As the nozzle pitches are different in the overlap region (NP2≠NP3), there is at least one aligned nozzle pair “AP” that provides the smallest value of nozzle pitch variation “Δ” between the nozzle pitch NP2 and the nozzle pitch NP3 when switching from one array to the other at the transition point. By choosing this ‘best’ aligned pair, AP, as the transition point in the overlap region when switching from array A1 to array B1, banding or visible artefacts in the transition region are reduced or avoided.

FIG. 3 further illustrates a nozzle masking pattern, which may be used to define which nozzles are used for printing an image and which are not. The nozzles of array A1 of the first head module 101 up to and including the nozzle at the transition point AP, and the nozzles of array B1 of the second head module 102 after the nozzle at the transition point AP, are enabled and used for printing, as is indicated by dark circles. In an alternative nozzle masking pattern for the arrays A1 and B1, the nozzles of array A1 of the first head module 101 up to the nozzle (but not including the nozzle) at the transition point AP, and the nozzles of array B1 of the second head module 102 including and after the nozzle at the transition point AP, may be enabled and used for printing. In both these example nozzle masking patterns, only one of the nozzles of the aligned nozzle pair at the transition point AP is enabled at a time. However, in a further example, it is possible to enable both the nozzles at the transition point AP, for example where each may print a lower droplet volume compared to the neighbouring nozzles. In yet another example, it is possible to alternate (or otherwise change over time) which nozzle of the aligned nozzle pair at the transition point AP is enabled.

Figure 4:
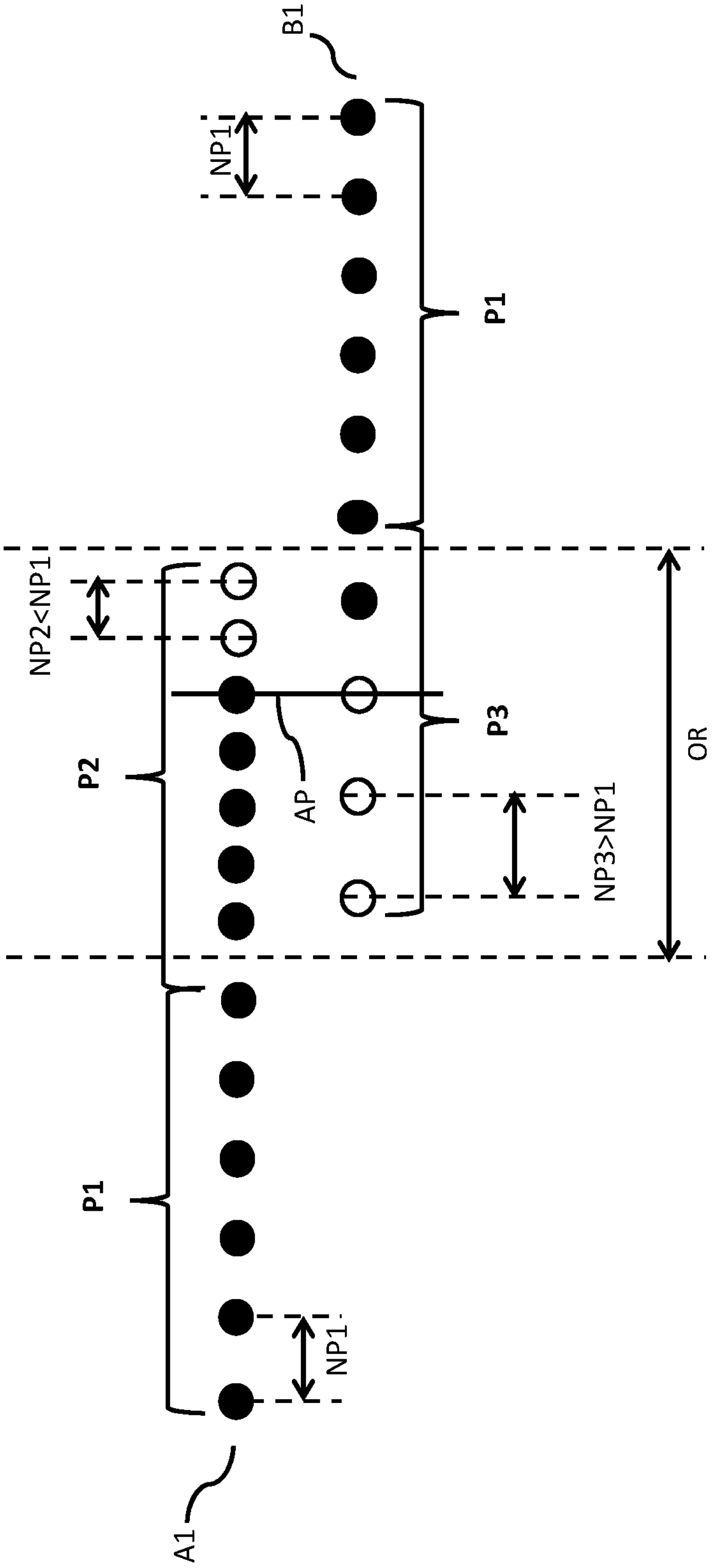
FIG. 4 is a schematic illustration of two partially overlapped nozzle arrays of a first head module and a second head module respectively, the nozzle array of the first head module comprising a first portion having a first nozzle pitch and a second portion having a second nozzle pitch, and the nozzle array of the second head module comprising a first portion having the first nozzle pitch and a second portion having a third nozzle pitch.

According to another implementation of the present invention, an alternative arrangement to that depicted in FIG. 3 is shown in FIG. 4. FIG. 4 shows an arrangement in which the overlap region “OR” comprises different pitches of nozzle array A1 and nozzle array B1. In FIG. 4, a portion P3 of nozzle array B1 comprises a pitch NP3 that is different to that of the pitch NP1 of the portion P1 of nozzle array B1. The pitch NP3 may be greater than the pitch NP1 such that (NP3>NP1). Alternatively, the pitch NP3 may be smaller than pitch NP1 such that (NP3<NP1). If the nozzle pitch NP1 shown in FIG. 4 is considered as the nominal pitch, pitch NP2 of nozzle array A1 is smaller than the nominal pitch NP1 i.e. (NP2<NP1), whereas pitch NP3 of nozzle array B1 is greater than the nominal pitch NP1 i.e. (NP3>NP1).

According to a further implementation of the present invention, the nozzle array of the first head module and the nozzle array of the second head module may each further comprise a third portion in which nozzles are arranged at a third nozzle pitch. In this case, the third portion of the first head module may be configured to overlap with the first portion of the second head module.

In all of the above examples, the different pitches are shown in the overlap region, which is advantageous where more than two modules are adjacent one another, so the first and third regions of adjacent modules can be used to overlap in a similar way to adjacent arrays that may have a similarly designed series of nozzle pitches. Moreover, at the transition point, it is easier to match the nozzle pitch of the second nozzle array when transitioning from the first nozzle array to the second nozzle array, so as to avoid or reduce any visual artefacts in the printed image. All of the above examples may be used to create a transition between the first head module and the second head module resulting in a visually seamless stitch, i.e. without any visual artefacts or with fewer visual artefacts. The stitch is a sub-region in the overlap region composed of the last enabled nozzle of the first head module and the first enabled nozzle of the second head module. The best aligned nozzle pairs AP define the transition points between overlapping nozzle arrays in the apparatus, which in turn may be used to define nozzle masking patterns according to user requirements.

It should be noted that the arrangement of different pitches are for illustrative purpose only and any number and combination of suitable nozzle pitches may be envisaged. Further, the nozzle pitch in the overlap region of the first head module and/or the second head module can be gradually increasing or gradually decreasing.

Head Module Alignment Within Droplet Deposition Head or Head Alignment Within Apparatus Generally, for accurate printing without visual artefacts due to transitioning between overlapping arrays, the head modules within the droplet deposition head, and the droplet deposition heads within the droplet deposition apparatus, must be aligned with respect to each other to a tight tolerance when the apparatus or head is built, or assembled. Further, in the droplet deposition apparatus, it is also necessary to align the droplet deposition heads when a droplet deposition head is replaced (e.g. when the droplet deposition head becomes faulty).

Figure 5:
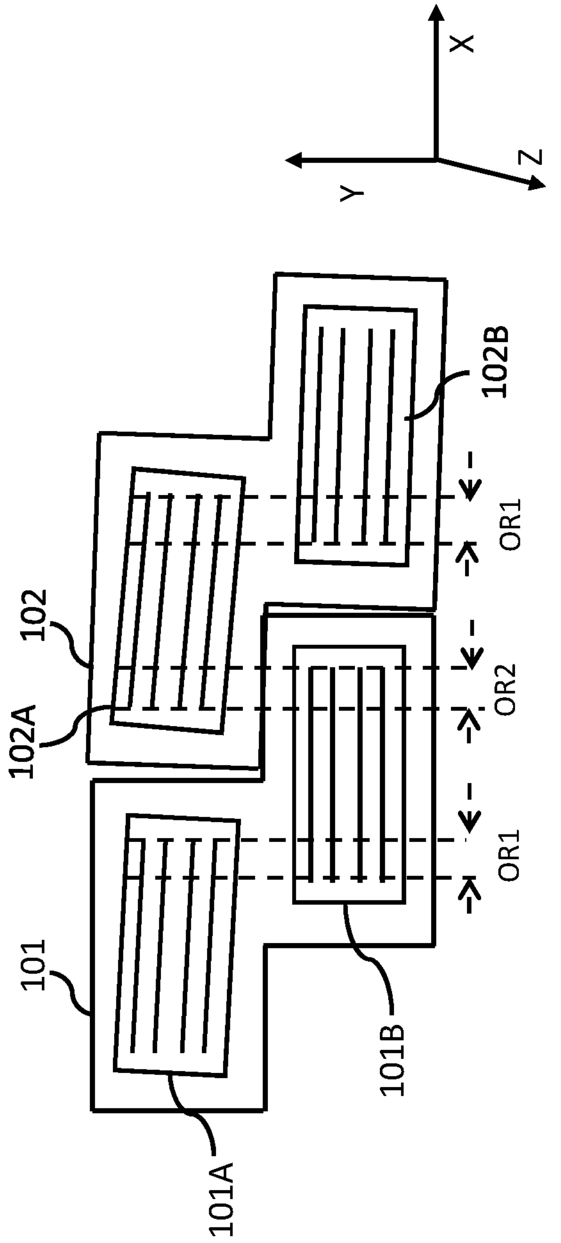
FIG. 5 is a schematic diagram of misaligned head modules within first and second misaligned droplet deposition heads.

FIGS. 2A and 2B show a case of ideal alignment between heads and between head modules within a head. FIG. 2A shows ideal alignment between heads 101, 102, and ideal alignment between nozzle arrays of head modules 101A, 101B within head 101, and ideal alignment between nozzle arrays of head modules 102A, 102B within head 102, such that the array directions of the arrays of the head modules and heads extend parallel to one another. As shown in FIGS. 3 and 4, there will be at least one aligned nozzle pair AP in the overlap region of two head modules 101A, 101B, 101C, 101D, 102A, 102B, 102C, 102D, or two heads 101, 102. For more than two modules per head, in an ideal alignment situation where all modules are perfectly aligned with respect to one another during manufacture, the best aligned nozzle pair AP may be located at the same transition point for pairs of overlapping modules. Similarly, if a further head were mounted in perfect alignment next to another head, the best aligned nozzle pair AP may be located at the same transition point for pairs of overlapping heads. However, due to manufacturing variations or misalignment, the heads 101, 102 and/or the head modules 101A, 101B, 102A, 102B may be parallel misaligned in the array direction or in the print direction 500, and/or angularly misaligned in the z-direction, as shown in FIG. 5, so that the physical location of the best aligned nozzle pair cannot be predicted or assumed to be the same as for other overlapping heads or head modules. Hence, it is necessary to consider the skew angle and/or positional offset to determine the best aligned nozzle pairs in the overlap region of two or more head modules or of two or more heads so as to print without (or at least with reduced) visual artefacts. Further, the actual positions or errors in positions of the heads and/or head modules within the apparatus may be different, hence, it may be required to consider the actual positions or errors in positions of the heads and/or head modules to determine the best aligned nozzle pairs.

To compensate for these variations or skews, it may be possible to perform mechanical fine adjustments of the overlapping heads to accurately align the nozzles in the overlap region, such that transitioning from one head module or head to the adjacent head module or head results in reduced visual artefacts (or minimal artefacts). However these processes can be very expensive and time consuming, and may require specialised personnel or specialised tools, especially when high accuracy is required in the case of a high resolution droplet deposition head, such as a 1200 dpi head.

Various Misalignments or Skews Within Apparatus

Further, even with such fine adjustments of head-to-head alignment within the droplet deposition apparatus or head module-to-head module alignment within the droplet deposition head, the achievable alignment may be inadequate to reduce or remove visible artefacts. In addition, slight misalignment in the droplet deposition apparatus due to other factors may contribute to the total skew in the droplet deposition apparatus, resulting in visible artefacts in the printed image. Those factors could be one or more of: skew of the position of the head modules within two or more droplet deposition heads, skew of the droplet deposition heads relative to a droplet deposition head mounting system (e.g. a printbar, carriage or rail); skew of the droplet deposition head mounting system relative to the droplet deposition apparatus; skew of the media; skew of the media holding mechanism relative to the media; or skew of the droplet deposition apparatus relative to the media holding mechanism. The human eye is sensitive to step changes in optical density and, depending on the print medium, may be able to detect misalignments or faults that constitute a step change along a printed line around 5 μm wide. In graphics printing and/or when using UV curable inks, the fluid or ink does not spread as much once on the media compared to other applications such as printing on paper or fabric, such that limited 'blurring' occurs which might otherwise reduce the appearance of a fault to the human eye.

Figure 6:
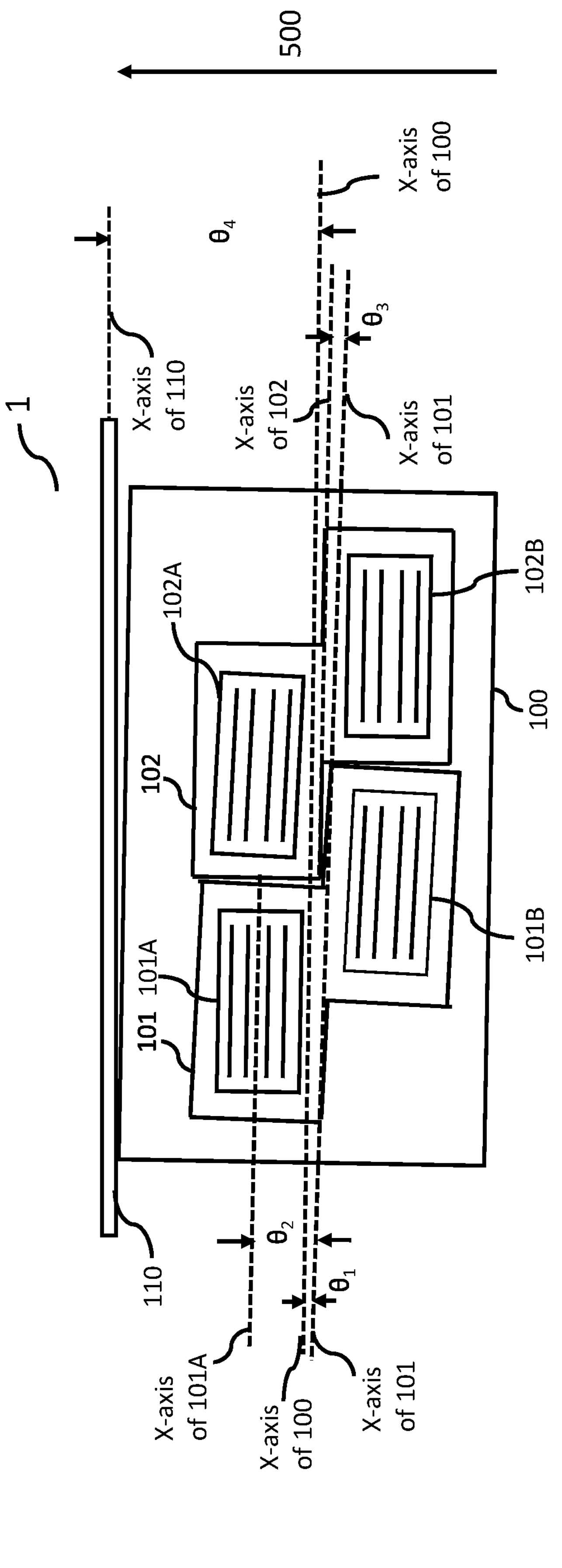
FIG. 6 is a schematic diagram showing misalignments between a head module, a droplet deposition head, a droplet deposition head mounting system, and a rail in a droplet deposition apparatus.

FIG. 6 illustrates an arrangement of misaligned head modules and heads with respect to one another and with respect to a droplet deposition head mounting system 100 that in turn is mounted to a rail extending perpendicular to the print direction 500 within the droplet deposition apparatus. The illustrated droplet deposition apparatus 1 comprises a plurality of heads 101, 102, each having two head modules 101A, 101B, 102A, 102B respectively that are partially overlapped with each other along the print direction 500. The heads 101, 102 are mounted on a droplet deposition head mounting system 100 which may be in communication with a rail 110 of the droplet deposition apparatus 1. FIG. 6 shows mounting of two heads on the same droplet deposition head mounting system 100, however this is not necessary and each head may have a separate droplet deposition head mounting system. The droplet deposition head mounting system 100 may comprise a carriage, a printbar or a mounting frame. In some examples, the rail 110 may function as the droplet deposition head mounting system such that the heads 101, 102 are directly mounted on the rail 110.

FIG. 6 depicts the possible misalignments between nozzle arrays as a result of misalignment between different components of the droplet deposition apparatus 1. For example, misalignment between head modules within the head, misalignment between heads, misalignment of heads relative to the droplet deposition head mounting system, and misalignment of droplet deposition head mounting system relative to the rail or to the droplet deposition apparatus, are indicated and represented as skew angles θ. In the present description, each skew angle is an angle by which a component is arranged with respect to a main axis (long axis) of the other component in the apparatus and indicates the extent by which it is non-parallel to the main axis. In FIG. 6, the skew angle between the long axis (X-axis) of the droplet deposition head mounting system 100 and the long axis (X-axis) of heads 101, 102 is depicted as $\theta_1$, the skew angle between the nozzle array direction (X-axis) of head module 101A and the long axis (X-axis) of the head 101 is depicted as $\theta_2$, the skew angle between the long axis (X-axis) of head 101 and the long axis (X-axis) of head 102 is depicted as $\theta_3$, and the skew angle between the long axis (X-axis) of the rail 110 and the long axis (X-axis) of the droplet deposition head mounting system 100 is depicted as $\theta_4$. It should be noted that $\theta_1$ can be calculated for each head present in the apparatus 1 with respect to the droplet deposition head mounting system 100, and $\theta_2$ can be calculated for each head module present within each head. $\theta_2$ is generally calculated at the factory.

The total skew angle in the droplet deposition apparatus comprises at least a combination of: skew angle of the first and second head modules relative to the droplet deposition head; skew angle of at least one of the head modules relative to a module mounting system; skew angle of the first head module relative to the second head module; skew angle of the module mounting system relative to a datum of the droplet deposition apparatus; skew angle of a media; skew angle of a media holding mechanism relative to the media; and skew angle of the media holding mechanism relative to a datum of the droplet deposition apparatus.

Thus, in FIG. 6, the total skew angle θ in the droplet deposition apparatus 1 may comprise at least a combination of: skew angle ($\theta_2$) of the head modules 101A, 101B, 102A, 102B relative to the droplet deposition head 101, 102; skew angle ($\theta_1$) of the droplet deposition heads 101, 102 relative to a droplet deposition head mounting system 100; skew angle ($\theta_3$) of first droplet deposition head 101 relative to second droplet deposition head 102; skew angle of the droplet deposition head mounting system 100 relative to a datum of the droplet deposition apparatus 1 ($\theta_4$); skew angle of the media; skew angle of the media holding mechanism relative to the media; and skew angle of the media holding mechanism relative to a datum of the droplet deposition apparatus. The total skew angle θ in the droplet deposition apparatus may be calculated by combining all skew angles present in the apparatus. Therefore, in this case, the total skew angle $\theta=\theta_1$ (head 101)+$\theta_1$ (head 102)+$\theta_2$ (head module 101A)+$\theta_2$ (head module 101B)+$\theta_2$ (head module 102A)+$\theta_2$ (head module 102B)+$\theta_3$+$\theta_4$.

In case of a single head in the apparatus, the total skew angle $\theta=\theta_1$ (head 101)+$\theta_2$ (head module 101A)+$\theta_{02}$ (head module 101B)+$\theta_4$. As mentioned above, the rail 110 may function as the droplet deposition head mounting system instead, in which case $\theta_4$ is not present.

Therefore, from the above-mentioned equations, to calculate the total skew angle θ, mainly $\theta_1$ and $\theta_2$ are required. At factory level, the skew angles $\theta_1$ i.e. the skew angle between the long axis (X-axis) of the droplet deposition head mounting system and the long axis (X-axis) of the head, and/or the actual positions or error in positions of head modules within each head, $\theta_2$ i.e. the skew angle between the nozzle array direction of head module and the long axis (X-axis) of the head, and optionally $\theta_3$ i.e. the skew angle between the long axes (X-axes) of two heads, may be used to determine best aligned nozzle pairs in the overlap regions. The $\theta_1$ values may be measured and stored at factory level which will be explained below, and $\theta_2$ values may also be measured and stored at factory level. Alternatively, the actual position and/or error in position of each head module in each head may be measured and stored at factory level, and $\theta_1$ and $\theta_2$ values may be measured and stored, for example, at a printer manufacturer site or during assembly.

After assembly of the droplet deposition apparatus the best aligned nozzle pairs determined at factory level, or alternatively the best aligned nozzle pairs determined based on the actual positions or error in positions of head modules in each head, for example, at the printer manufacturer site or during assembly, may be used to determine total skew angle θ of a slot of the droplet deposition apparatus in which the head or head module is mounted, once the head is installed in the droplet deposition apparatus. The skew of the media and skew of the media holding mechanism relative to the media may also be added while calculating the total skew angle θ. The calculated total skew angle of the slot in the droplet deposition apparatus 1 may be stored in the storage 200 (shown in FIG. 1) of the droplet deposition apparatus 1. Alternatively, the apparatus 1 may further comprise a second/further storage (not shown) for storing the calculated total skew angle in the droplet deposition apparatus 1.

$\theta_1$ and Determining Best Aligned Nozzle Pair Between Two Head Modules

Figure 7:
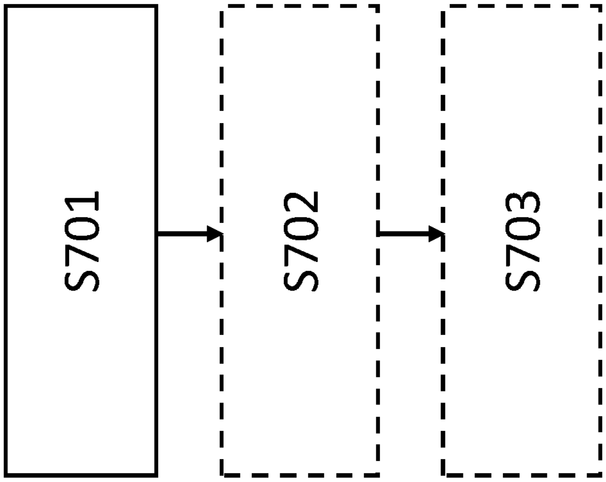
FIG. 7 is a flowchart of a method for determining skew information related to a droplet deposition apparatus that is carried out.

FIG. 7 shows a method for determining misalignment information in respect of a droplet deposition apparatus that may be carried out. At step S701, an actual position of each head module within each head and/or an error in position of each head module is determined at factory level and is stored in the storage 200. The actual positions of the head modules (for example, in units of millimetres) may be stored as absolute or relative values. For example, the actual position of a first head module may be an absolute value and is a distance from the droplet deposition head frame or a distance from one or more datums of the droplet deposition apparatus, whereas the actual position of a second head module may be a relative value that is either calculated based on the actual position of or distance from the first head module and/or based on a distance from the droplet deposition head frame or a distance from one or more datum of the droplet deposition apparatus. Further, for more accuracy, the actual positions of the head modules may be calculated using more than one co-ordinate with respect to the droplet deposition head or droplet deposition apparatus. In the factory, from the actual position of the head module and from an ideal position of the head module, an error in position (for example, in units of micrometres) of the head module can be calculated as: (Error in position)=(Ideal position of head module)−(Actual position of head module). Therefore, error in position is a difference between the ideal position of head module and the actual position of that head module. It should be noted that error in position could be positive, negative or zero. Furthermore, in addition to storing actual positions of two or more head modules in the storage, the error in positions of the two or more head modules may be stored in the storage. Alternatively, instead of storing actual positions of two or more heads in the storage, only error in positions of two or more head modules may be stored in the storage. This may be advantageous to save storage space as the number of bits required to store error in position will be less than the number of bits required to store the actual position of a head module.

Based on determined actual positions or errors in positions of the head modules, at step S702, one or more best aligned nozzle pairs AP in an overlap region of the nozzle array of the first head module 101A and the nozzle array of the second head module 101B are determined, for a plurality of skew angles of at least one of the head modules 101A, 101B or at least one of the heads 101, 102 relative to a datum of the droplet deposition apparatus (for e.g. printbar, carriage, rail) and/or for a plurality of positional offsets of the second head module 101B or the second head 102 relative to the first head module 101A or the first head 101. It should be noted that here the first head 101 comprises two head modules 101A and 101B whereas the second head 102 comprises two head modules 102A and 102B. The one or more best aligned nozzle pairs AP in the overlap region of the first and second head module 101A, 101B, 102A, 102B may be determined by printing a test image and then by analysing the test image to determine one or more best aligned nozzle pairs. The test image may comprise one or more test patterns. The analysis may be carried out visually by the user or electronically by a controller by analysis of the test image using an image analysis algorithm. The electronic method of analysis will be described in more detail below.

In the next step S703, a table of determined best aligned nozzle pairs AP and corresponding skew angles $\theta_1$ and/or corresponding positional offset is stored in the storage 200. The storage 200 may be part of at least one of the head modules 101A, 101B, 102A, 102B or heads 101, 102, or may be external to the head modules 101A, 101B, 102A, 102B or heads 101, 102.

It should be noted that the steps S702 and S703 are optional at factory level and might not be carried out at factory level. Instead, steps S702 and S703 may be carried out, for example, at the printer manufacturer site or during assembly based on the stored data at step S701. Therefore, step S701 and steps S702, S703 are independent. For example, the steps S701-S703 all can be carried out at the same location. Alternatively, step S701 can be carried out at one location and steps S703, S703 can be carried out at other location.

An example of a table that may be stored in the storage 200 at step S703, for head 101 is shown in FIG. 8. The table shows various skew angles $\theta_1$ of the head 101 relative to a datum of the droplet deposition apparatus and nozzle numbers of corresponding determined best aligned nozzle pairs of head modules 101A and 101B. As shown in the table, the aligned nozzle pairs for skew angles $\theta_1$ ranging from −0.05 degrees to +0.05 degrees were determined from test prints and stored. In equally suitable variants of such a table, any number of nozzle pairs for any number of skew angles may be determined and stored. The size of the table may be dependent on the size of the storage. Further, the table shows only one best aligned nozzle pair for each skew angle. However, the invention is not limited to this, and the overlap region may have more than one aligned nozzle pair, and a selection of, or all, best aligned nozzle pairs may be stored in the table. The user then may choose from the selection which aligned nozzle pair to use as a transition point depending on the droplet deposition apparatus set-up and alignment of head modules with respect to each other in the droplet deposition apparatus. Furthermore, the stored table may be useful to determine the total skew angle of the slot in the droplet deposition apparatus, as will be described in more detail later.

Determining Best Aligned Nozzle Pairs Using Software Method

Turning now to the electronic method for determining one or more best aligned nozzle pairs in an overlap region of a plurality of head modules or a plurality of heads, a controller is provided to communicate with the droplet deposition apparatus and configured to access and run the electronic method of image analysis that analyses the test image. The controller determines, using the electronic method, the best aligned nozzle pairs for each detected overlap region in the test image, and then disables the appropriate nozzles in one or more head modules or one or more droplet deposition heads. The electronic method of image analysis is advantageous as the process will be faster, more reliable and less prone to human errors than the visual analysis method. Furthermore, the test image of the overlap region may be made more compact as it is not required to be analysed by visual inspection, thereby using less resources such as media and ink. Moreover, as the method will be performed by the controller, there is no need of skilful operators.

The method will be now described with reference to the overlap region between two head modules but it should be noted that the method is equally applicable to the overlap region between two or more droplet deposition heads, each comprising one or more head modules.

Each head module comprises an array of a plurality of nozzles and, in the overlap region, nozzles of an array A1 of the first head module 101A are arranged at a first nozzle pitch NP2, and nozzles of an array A2 of the second head module 101B are arranged at a second nozzle pitch NP3. The method comprises the steps of: printing a test image via the plurality of nozzles from the nozzle arrays in the overlap region, wherein the test image comprises one or more test patterns for one or more nozzle pairs in the overlap region of nozzle arrays; scanning the printed test image; calculating average colour density across one or more areas of the scanned test image, wherein the scanned test image comprises one or more sections and each section comprises a stitch area forming a transition area from one array to the other within the overlap region, and a non-stitch area which is outside the stitch area; determining a colour density variation across the one or more sections of the scanned test image; and, based on the determined colour density variation, determining the one or more best aligned nozzle pairs in the overlap region of nozzle arrays. The non-stitch area refers to one or more areas within the section that is/are inside the overlap region but outside the stitch area.

Figure 9:
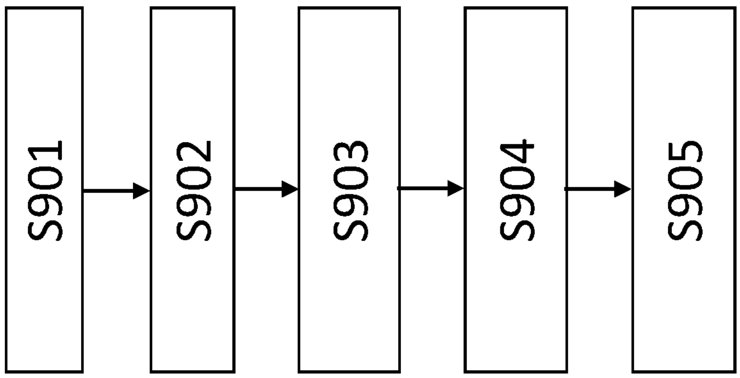
FIG. 9 is a flowchart of a method for determining one or more best aligned nozzle pair in an overlap region of plurality of head modules.

General Software Method (FIG. 9)

A flowchart of the method steps described above for electronically determining one or more best aligned nozzle pairs in the overlap region of a plurality of head modules is shown in FIG. 9, comprising steps S901 to S905. Each step will now be described in detail with reference to FIGS. 10 to 12.

At step S901, a test image such as a pattern of dots or lines is printed by the plurality of nozzles in the overlap region. The same test image may be printed by each head module in the droplet deposition apparatus 1; however different test images may be printed instead. Moreover, one or more identification marks such as a barcode or fiducials may be printed to identify a specific test image resulting from a specific head or head module.

Example of Test Pattern in Test Image

Figure 10:
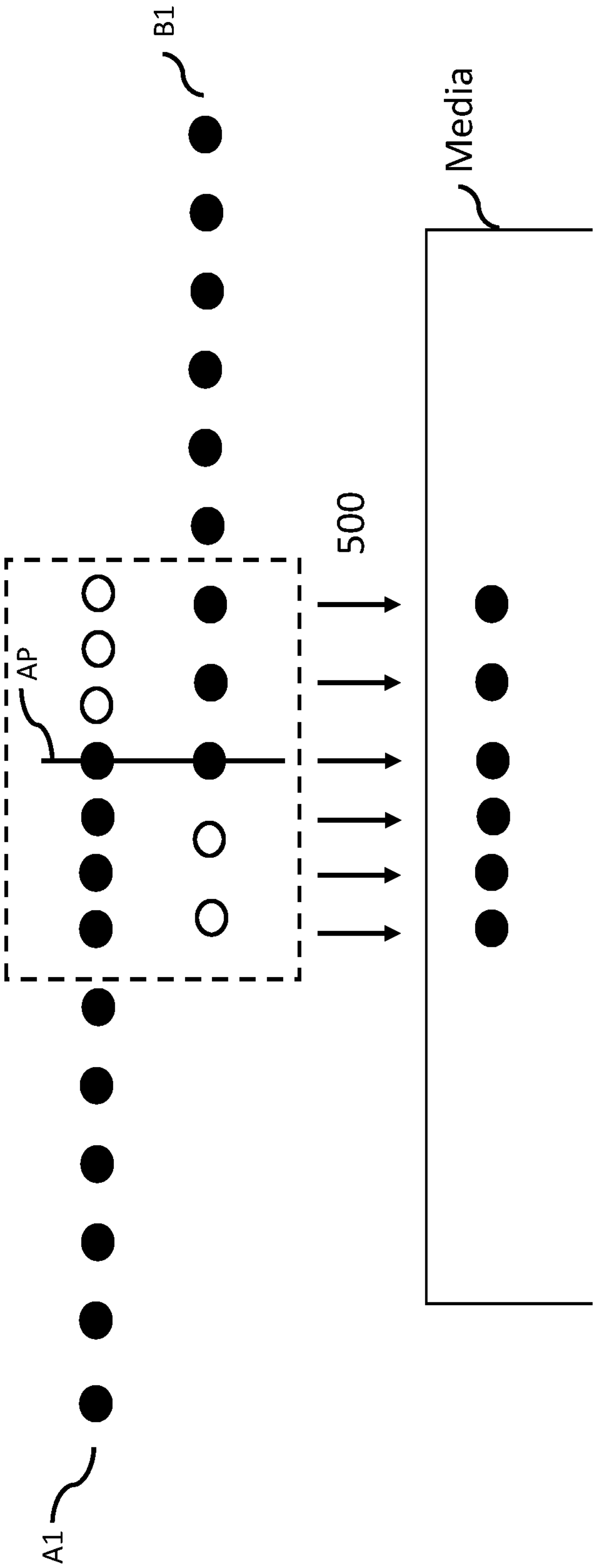
FIG. 10 depicts an image printed on a media by the nozzles of a first nozzle array of first head module and nozzles of a second nozzle array of second head module, in an overlap region.

For a given overlap region of two nozzle arrays, there may be a number of nozzle pairs, each made up of a nozzle from the first nozzle array and a nozzle from the second nozzle array, and a number of test patterns specific for those nozzle pairs can be generated and printed. All these test patterns together form the test image for that overlap region. Therefore, the test image may comprise one or more test patterns. An example of a test pattern is depicted in FIG. 10. The example test pattern illustrates printed dots on the media printed by the nozzles of the nozzle array A1 of the first head module 101A and nozzles of the nozzle array B1 of the second head module 101B, that are located in the overlap region (shown with dotted lines). In FIG. 10, "AP" is the aligned nozzle pair and defines a potential transition point. The enabled nozzles of arrays A1 and B1 that are used for printing are depicted with dark circles, whereas the disabled nozzles of nozzle array A1 and B1 that are not used for printing are depicted with empty circles. FIG. 10 shows an example of one printed row. Repeatedly printed rows will result in the test pattern. FIG. 10 illustrates one of the possible nozzle masking patterns, in which only the nozzles of the nozzle array A1 up to (and including) the transition point AP are used for printing, and from the transition point AP onwards only nozzles of the nozzle array B1 are used for printing. In addition, at the transition point AP itself, the nozzle of the nozzle array A1 and the nozzle of the nozzle array B1 each print a lower droplet volume than other nozzles in the array.

Examples of Pixel Offset

Figure 11:
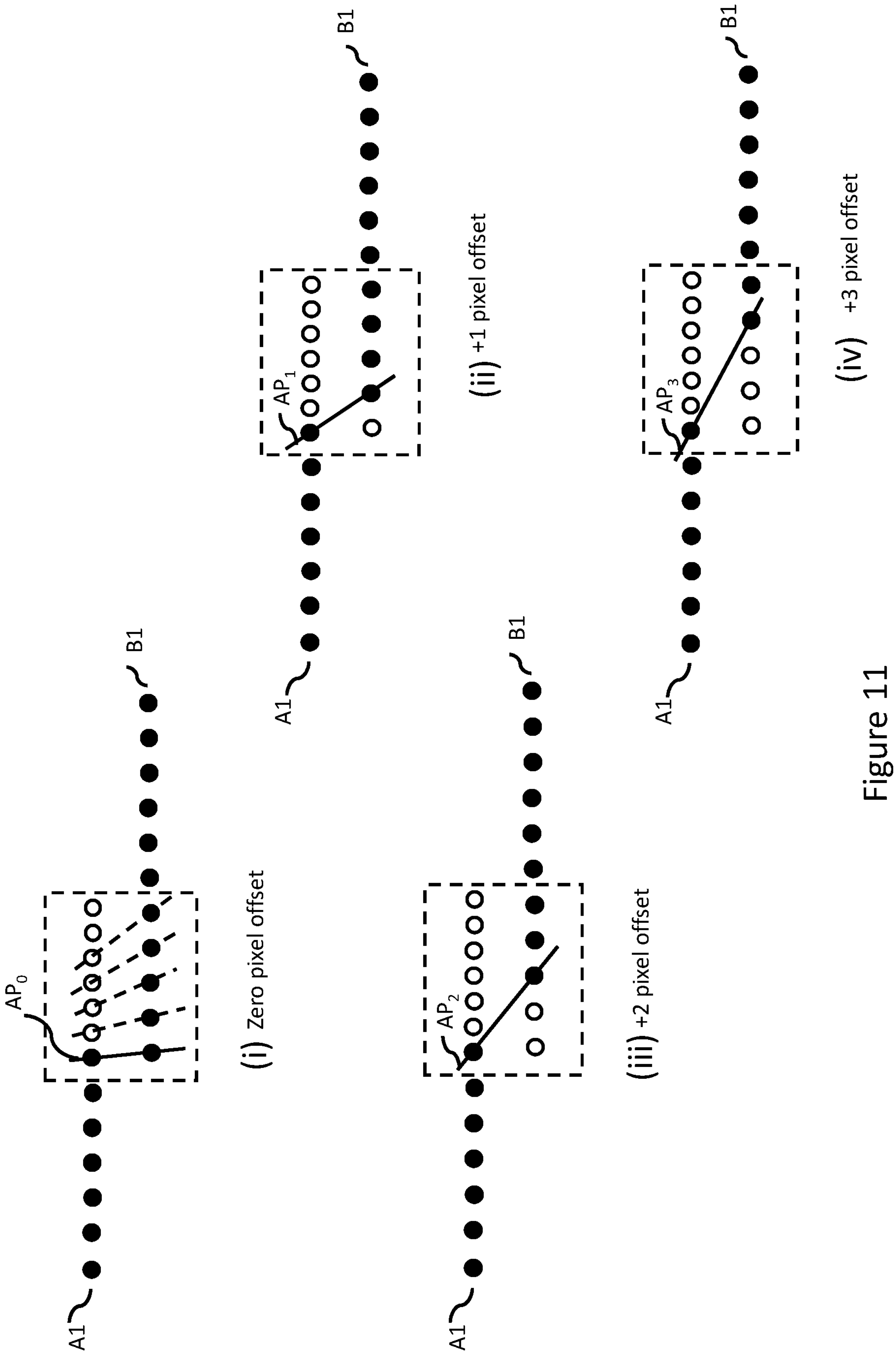
FIG. 11 (*i*)-(*vii*) depicts pixel offsets based on a selected nozzle pair.
Figure 11:
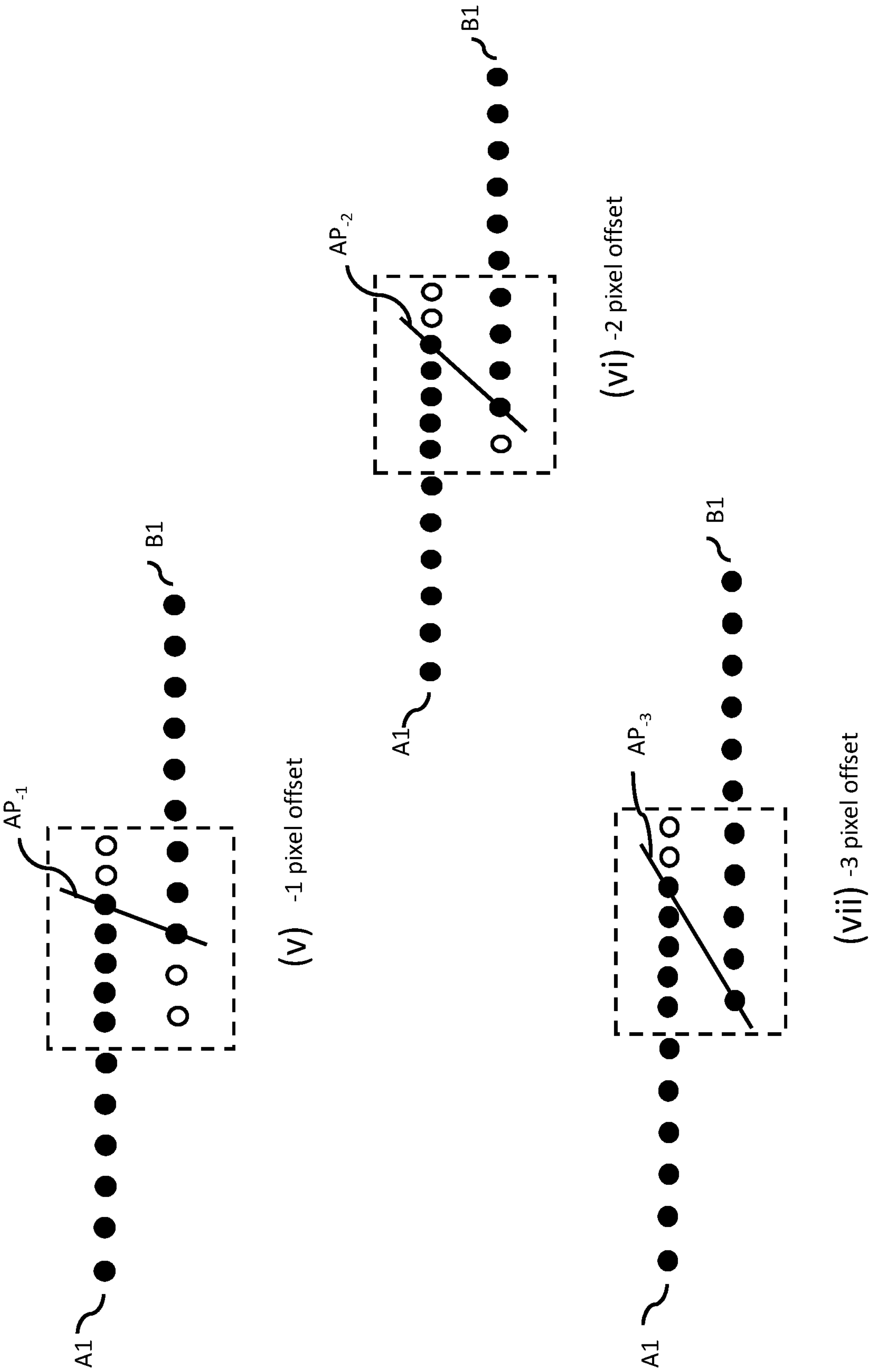

To determine the best aligned nozzle pair, the user can start analysis with the nozzle pairs in the overlap region having zero pixel offset. However, as the nozzle pitches of nozzle arrays A1, B1 are different in the overlap region, the best aligned nozzle pair may not always be found with zero pixel offset. Also, there may be more than one best aligned nozzle pair in the overlap region, hence other combinations of pixel offsets may need to be considered. To begin with, the test pattern for each nozzle pair having at least zero or one pixel offset is generated and printed. FIGS. 11(*i*)-(*vii*) illustrate the nozzle pairs (AP) chosen for various pixel offsets. The chosen nozzle pairs are transition points AP in the test pattern. FIG. 11(*i*) depicts the nozzle pair $AP_0$ for zero pixel offset, FIG. 11(*ii*) depicts nozzle pair $AP_1$ for +1 pixel offset, FIG. 11(*iii*) depicts nozzle pair $AP_2$ for +2 pixel offset, FIG. 11(*iv*) shows nozzle pair $AP_3$ for +3 pixel offset, whereas, FIG. 11(*v*) shows nozzle pair $AP_{-1}$ for −1 pixel offset, FIG. 11(*vi*) shows nozzle pair $AP_{-2}$ for −2 pixel offset, and FIG. 11(*vii*) shows nozzle pair $AP_{-3}$ for −3 pixel offset. In other words, FIGS. 11(*ii*)-(*vii*) illustrate pixel offsets that are incremented or decremented by 1 with respect to FIG. 11(*i*). The pixel offset may increment or decrement by an integer or a non-integer value, for example by 0.5, and further it is not essential that the increment or decrement value for successive increments/decrements be same. In FIGS. 11(*i*)-(*vii*), as in FIG. 10, the nozzles of the nozzle array A1 after the chosen nozzle pair (transition point) and the nozzles of the nozzle array B1 before the chosen nozzle pair (transition point) are not used for printing.

It should be noted that FIGS. 11(*i*) to 11(*vii*) show one example of transition point for each pixel offset by selecting one nozzle pair in the overlap region as transition point. However, for each pixel offset, different transition points equal to the number of nozzle pairs in the overlap region can be selected and corresponding test patterns can be generated and printed. This is depicted in FIG. 11(*i*). The transition point $AP_0$ for zero pixel offset is depicted with a solid line; and for the same zero pixel offset, further transition points for further test patterns are shown with dotted lines.

Figure 12:
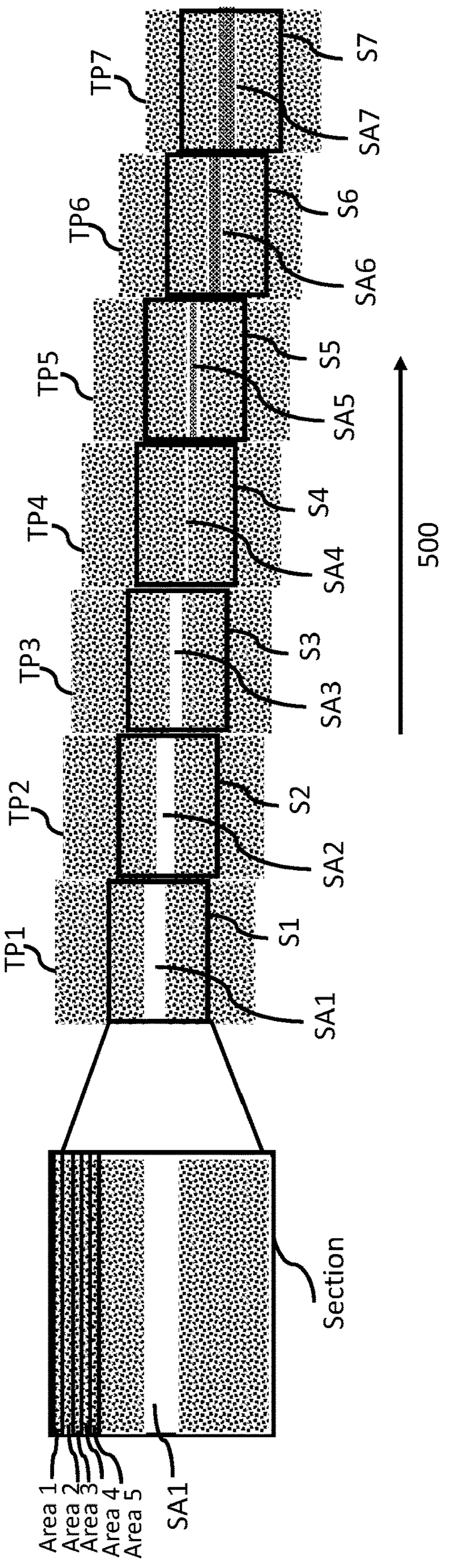
FIG. 12 shows an example of a scanned test image.

Scanning Step and Example of Scanned Test Image Comprising Printed Test Patterns In the next step S902 of FIG. 9, the printed test image is scanned by the scanner. The scanning step may be done manually or the scanning step may be automated using an inline scanner. FIG. 12 shows an example of a scanned test image. The scanned test image may comprise one or more printed and scanned test patterns. For illustration purposes, FIG. 12 illustrates a scanned test image comprising seven test patterns TP1-TP7 for zero pixel offset. Each test pattern corresponds to a different nozzle pair chosen as the transition point and having zero pixel offset. In an example, if there are 56 nozzles in the overlap region, the test image may comprise a maximum of 28 test patterns corresponding to 28 nozzle pairs that may be chosen as the transition point. In a similar manner, test images with +3, +2, +1, −1, −2 and −3 pixel offsets may be generated for a number of nozzle pairs chosen as the transition point for that pixel offset. Furthermore, to allow making the test image compact, the test patterns may be divided and arranged one below another. For example, 14 test patterns of a maximum of 28 may be arranged in an upper section of the test pattern, and 14 test patterns may be arranged below the upper section of the test pattern.

Each scanned test pattern of overlap region comprises a "section" which has one or more areas including the stitch area and neighbouring areas of the stitch area, printed by one or more nozzles of both arrays in the overlap region. The section can be a small region within the overlap region or may extend to cover the entire overlap region. The dimensions of the section are user defined and should be such that the section covers the stitch area and at least some neighbouring areas of the stitch area so as to easily analyse the colour density variation. In FIG. 12, the section is shown with a solid rectangle and the light or dark bands formed at the transition point are depicted as "stitch area". A stitch area is a sub-region in the overlap region composed of the dots printed by the last enabled nozzle of the first head module and by the first enabled nozzle of the second head module. The stitch area may also be defined as the transition point from which the printing may be transitioned from one head module to another head module. A good stitch area may be defined as a seamless transition from one head module to another head module, where "seamless" means "without visible banding". Further, a bad stitch area may be defined as one in which visible light or dark bands are formed in the printing direction.

FIG. 12 shows seven sections S1 to S7 and seven stitch areas, SA1 (Stitch area 1) to SA7 (Stitch area 7). If the plurality of enabled nozzles at the transition point are offset such that they do not overlap with each other, there will be a light band in the printed image along the printing direction 500; for example as shown for SA1 (Stitch area 1), SA2 (Stitch area 2) and SA3 (Stitch area 3). On the other hand, if the plurality of enabled nozzles overlap or partially overlap at the transition point, there will be a dark band in the printed image along the printing direction 500, as shown for SA5 (Stitch area 5), SA6 (Stitch area 6) and SA7 (Stitch area 7). If in the overlap region nozzles of the first head module are aligned with those of the second head module, a smooth transition is observed in the printed image along the printing direction 500, as indicated by SA4 (Stitch area 4). The variation in colour density measured in the direction of the array (i.e. transverse to the printing direction 500) is an indication of the quality of the transition that may be used to identify the best aligned nozzle pair. The lowest or no detectable colour density variation indicates the best aligned nozzle pair.

Reshaping of Scanned Test Image

Sometimes the scanned test image is skewed with respect to the printed image due to image rotation, due to scan defects such as the scan bar not moving across the printed image at a constant speed or not in synchronisation with the rate at which it is capturing pixel images, or due to scanner inaccuracies if the scanner is not perfectly set to the required resolution. Therefore, before the electronic analysis of the scanned image, scan defects need to be corrected so that exact positions within the printed image can be precisely found within the scanned image. The scanned image of each test image may be reshaped using any known reshaping techniques such as a warp perspective transform. The scanned image may be divided into sub-images which are reshaped, each using a warp perspective transform, after which the actual measured centres of the sub-images are mapped onto their expected positions, and in each sub-image the image around the centre is adjusted accordingly to match with respect to the centre.

It should be noted that reshaping of the scanned image may not be necessary for scanners that provide an accurate reproduction of the printed image.

Attributes such as scale, actual size, and orientation of the reshaped image and/or of the scanned image may be set to the same attributes of the printed image so that the positions of the sub-images within the scanned image and/or the reshaped image may be accurately predicted.

Colour Density Measurements

In the next step S903 of FIG. 9, from the scanned image (or the reshaped scanned image, if necessary) of each test image comprising the test patterns, average colour density measurements are made across one or more areas including the stitch area of each scanned test pattern of the scanned test image.

The head modules may have one or more defective nozzles which may interfere with the colour density measurements and may lead to a false positive or false negative result. For example, the colour density measurement made across the good stitch area should be the one showing the lowest colour density variation in a direction transverse to the printing direction. However, if there are one or more missing nozzles in the vicinity of the potentially best aligned nozzle pair, the missing or weak nozzles will represent a light band resembling a bad stitch area and, even if the transition point of the same test pattern results in low colour density variation, the results from this test pattern may lead to assigning it as a 'bad' stitch area (a false negative). In a further example, there may be a bad stitch area in the test pattern with the dark band formed in the direction of printing, as a result of enabled overlapping nozzles in the overlap region as described with respect to FIG. 12. However, if one or more of the overlapping nozzles are not working, the measured section may appear to have a low colour density variation which may result in it being considered a 'good' stitch area (a false positive).

Smoothing Algorithm

To reduce or prevent assignment of false positives or false negatives, a smoothing algorithm may be used across the scanned test image. In this algorithm, the background colour densities are measured across regions of the first and second head module before and after (i.e. outside of) each section. Here, a "region" could be outside the overlap region or could be within the overlap region but outside of the section. These regions may be called "reference regions". For example, in FIG. 12, the regions of each test pattern TP1-TP7 of the overlap region that are outside the sections S1 to S7 are reference regions. The reference region may comprise one or more areas printed by one or more nozzles of each array outside the section.

The colour density over each area in the reference regions printed by the first and second arrays (which could be arrays of adjacent head modules or arrays of adjacent heads) is averaged so as to give a background colour density value for each area printed by respective array in the section. The areas printed by the first array may be printed with a different colour density than the areas printed by the second array so as to more easily differentiate between the background colour density value of the first array and the background colour density value of the second array. Depending on which nozzles of which array printed a respective area in the section, the background colour density value of that array is subtracted from that area of the image in the section. In the stitch area of the section, an average of the background colour density values of both the first and second arrays is subtracted from the stitch area. After subtraction, the section image is replaced with the result of subtraction which results in the smoothed image.

The scanned (or reshaped scanned) image after application of the smoothing algorithm gives more reliable results than just the scanned (or reshaped scanned) image without the smoothing algorithm and is useful to find the good stitch area if there are one or more defective nozzles.

In the next step S904 of FIG. 9, a colour density variation across one or more sections of the scanned test image is determined, and at step S905, one or more best aligned nozzle pairs in the overlap region of nozzle arrays are determined based on the determined colour density variation across the sections of the scanned test image. The section with the lowest colour density variation is chosen as having the best aligned nozzle pair. The determined one or more best aligned nozzle pair are stored in the storage 200 of the apparatus 1.

FIG. 12 shows test image of test patterns TP1 to TP7 for zero pixel offset printed by selecting different nozzle pairs in the overlap region, and the steps S901 to S905 have been described above with respect to FIG. 12. However, steps S901 to S905 may be iterated for at least one pixel offset with at least one selected nozzle pair for that pixel offset. Furthermore, the test image may comprise a test pattern generated for zero pixel offset and a test pattern generated for at least one pixel offset, for at least one selected nozzle pair in the overlap region of nozzle arrays. The best aligned nozzle pair/s of each pixel offset may then be compared with each other, and out of those the nozzle pairs that result in overall lowest colour density variation across sections may be selected as one or more best aligned nozzle pairs for use.

The best aligned nozzle pair for the test image may be determined using two different methods—"method 1" and "method 2"—either used separately, or in combination to achieve a more accurate result. These methods will now outlined with respect to FIGS. 13 and 18. Both of these two methods may be applied to each test image and the average of these methods may be calculated to determine the best aligned nozzle pair in that test image. Alternatively, only one method may be applied to all test images, or one method may be applied to some test images and the other method may be applied to the remaining test images to determine best aligned nozzle pairs for each. The user may choose between these options based on his or her requirements or the required accuracy. For example, method 1 may be faster than method 2 due to less data processing being involved in method 1. Thus, if more processing speed is required, the user can choose method 1 over method 2.

Method 1 for Determining Best Aligned Nozzle Pair

Figure 13:
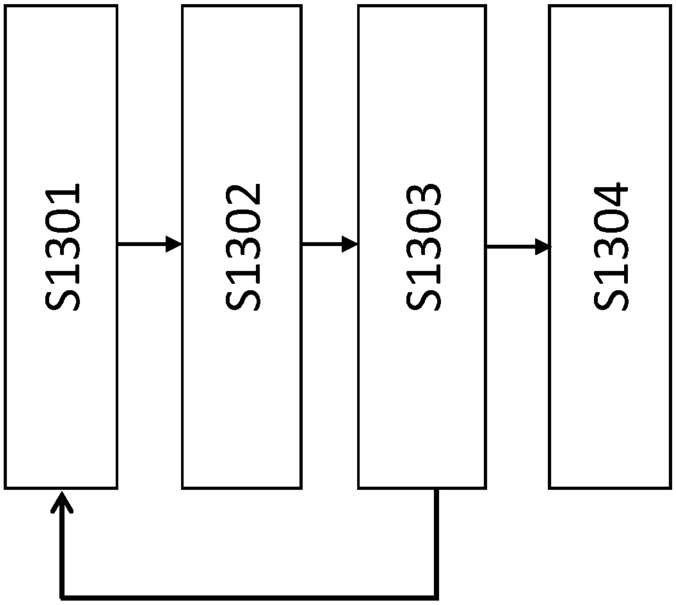
FIG. 13 is a flowchart of a method for determining the one or more best aligned nozzle pairs in the overlap region according to one variant of the present invention.

FIG. 13 is a flowchart of a method for determining the one or more best aligned nozzle pairs in the overlap region according to one variant of the present invention. At step S1301, average colour density across the non-stitch area is calculated. In this step, instead of calculating an average of each area individually, a combined average of two or more areas can be calculated. Moreover, it may not be necessary to calculate averages of all areas within the section and only the average of two or more neighbouring non-stitch areas of the stitch area may be sufficient to determine colour density variation. Next, at step S1302, average colour density across the stitch area within the section is calculated. Then, at step S1303, a colour density deviation of the stitch area is calculated by subtracting the calculated average colour density across the stitch area from the calculated average colour density across the non-stitch area. This is illustrated in FIG. 14.

Figure 14:
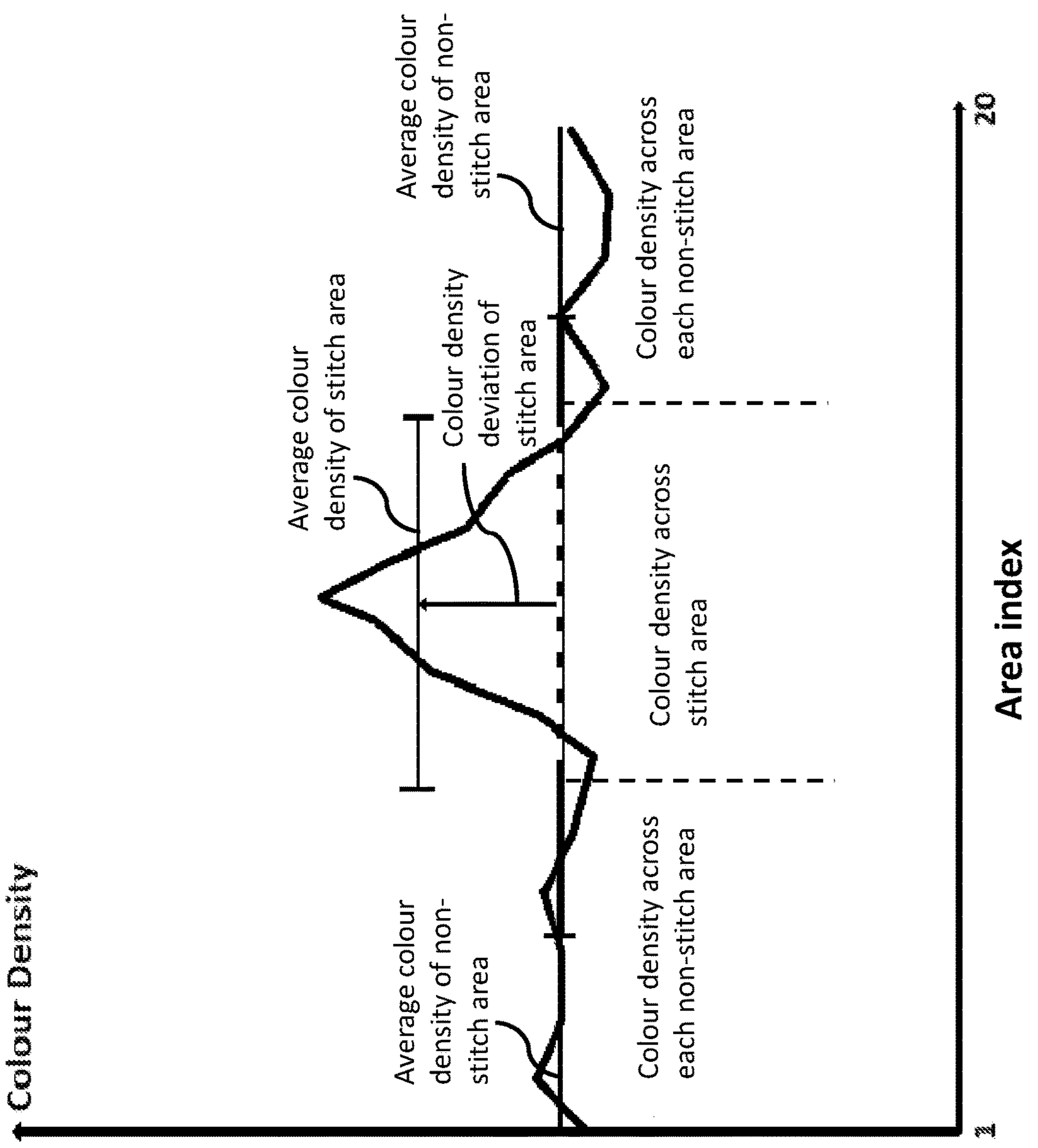
FIG. 14 is a graph of area index of areas within a section versus colour density of area and showing colour density deviation of a stitch area.

More particularly, FIG. 14 depicts a plot of area index (for e.g. Area 1, Area 2, Area 3 . . . etc. in FIG. 12) or area location of areas within the section versus colour density across area, and wherein the colour density deviation of the stitch area represents the colour density deviation of the stitch area from the neighbouring non-stitch area in the section. The plot shows a colour density variation across the section in the overlap region, and shows variation across around twenty areas of the section. The maximum peak shown in the plot corresponds to the colour density across the stitch area, whereas the small positive and negative peaks shown on both sides of the maximum peak correspond to the colour density across one or more non-stitch areas. The average colour density value across one or more non-stitch areas printed by the two arrays and the average colour density value of the stitch area are indicated with a solid horizontal bar. The difference between the average colour density of the stitch area and the average colour density of the non-stitch area is the "colour density deviation of stitch area" and is indicated with a solid vertical arrow line.

Figure 15:
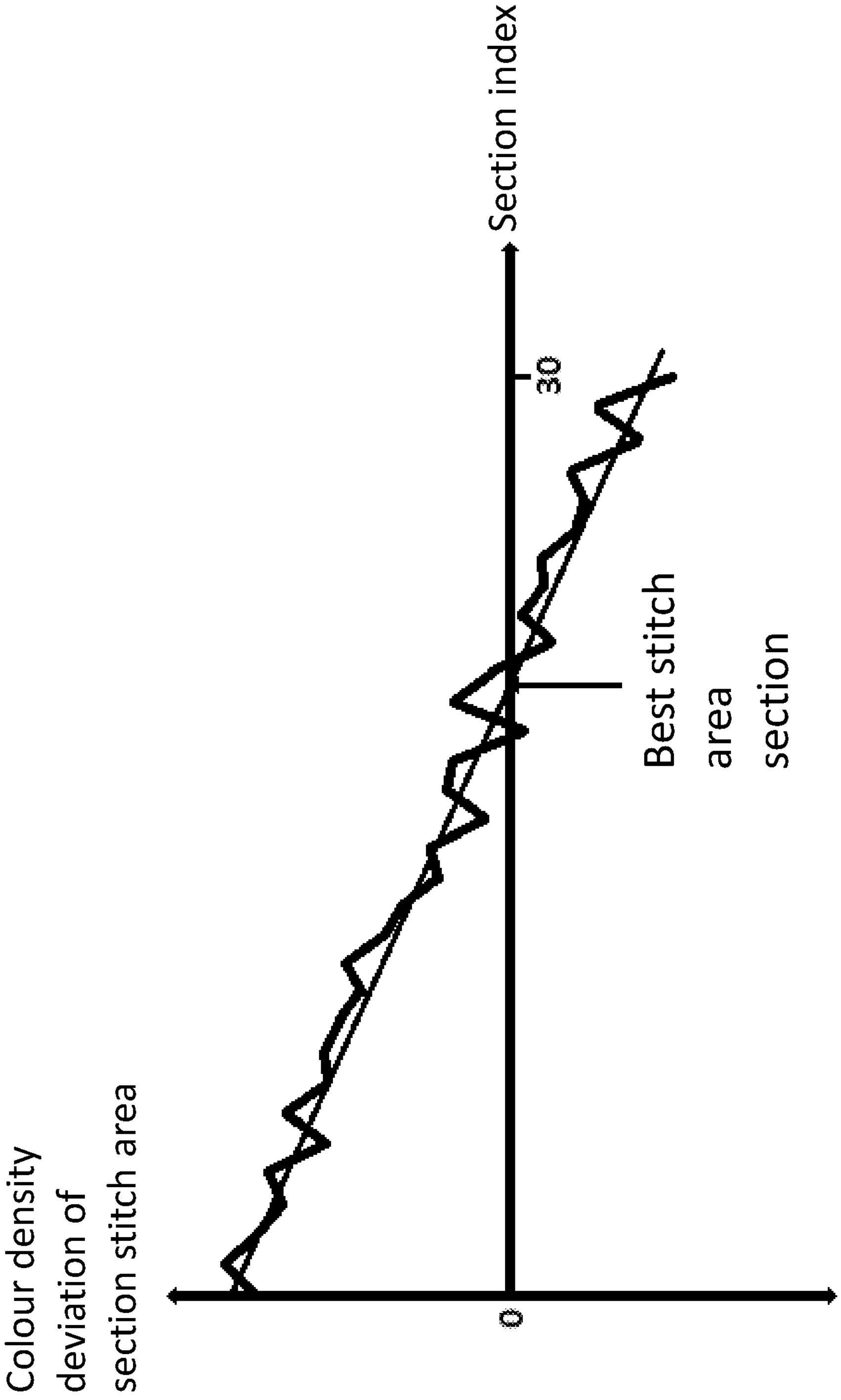
FIG. 15 is a graph of section index of sections within a scanned test image versus colour density deviation of section stitch area.

The above steps S1301 to S1303 are repeated for each section in the scanned test image and, as shown in FIG. 15, the determined colour density deviation of the stitch area of each section is plotted against a section index (for e.g. S1, S2, S3 . . . etc. in FIG. 12) of each section within the test image. A linear fit is then applied to the data and the section index at which the line intercepts the x-axis is considered as a "best stitch area section". For a section stitch area having a light band, the colour density deviation of the stitch area will be positive, whereas for a section stitch area having a dark band, the colour density deviation of the stitch area will be negative. For the best stitch area section, the stitch area provides lowest colour density variation from the first array to the second array and the colour density deviation of stitch area will be a minimum or zero. At step S1304, one or more best aligned nozzle pairs are determined based on the calculated colour density deviation of the stitch area. For the best aligned nozzle pair, the calculated colour density deviation of the stitch area of the section is zero or lowest compared to the calculated colour density deviations of the stitch areas of other sections. The determined one or more best aligned nozzle pairs may be stored in the storage of the apparatus.

Method 2 for Determining Best Aligned Nozzle Pair

Figure 16:
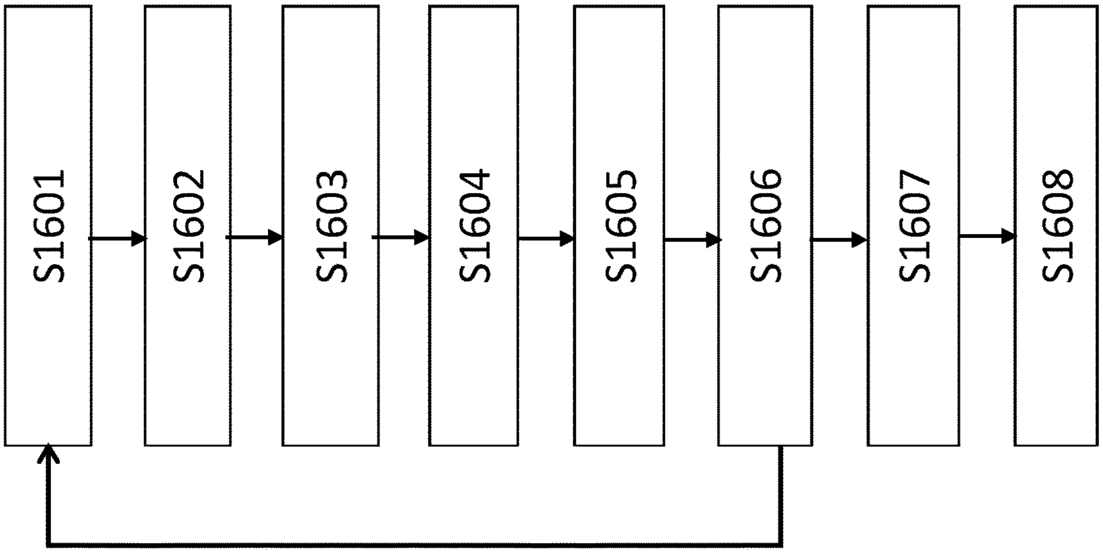
FIG. 16 is a flowchart of a method for determining the one or more best aligned nozzle pairs in the overlap region according to another variant of the present invention.

FIG. 16 is a flowchart of a method for determining the one or more best aligned nozzle pairs in the overlap region according to a second method variant. At step S1601, the combined average colour density of all areas (including the stitch area) in a section of the scanned test image is calculated. Then, at step S1602, the average colour density across each area (including the stitch area) within the section is calculated.

Next, at step S1603, the calculated average colour density across each area within the section is subtracted from the calculated combined average colour density of all the areas in the section. At step S1604, a colour density deviation of each area from the combined average colour density of all the areas is determined based on the result of subtraction in step S1603. At step S1605, absolute values of these colour density deviations of one or more areas in the section are determined, and at step S1606 these absolute values of colour density deviations of the areas are summed to find colour density deviation in the section.

Figure 17:
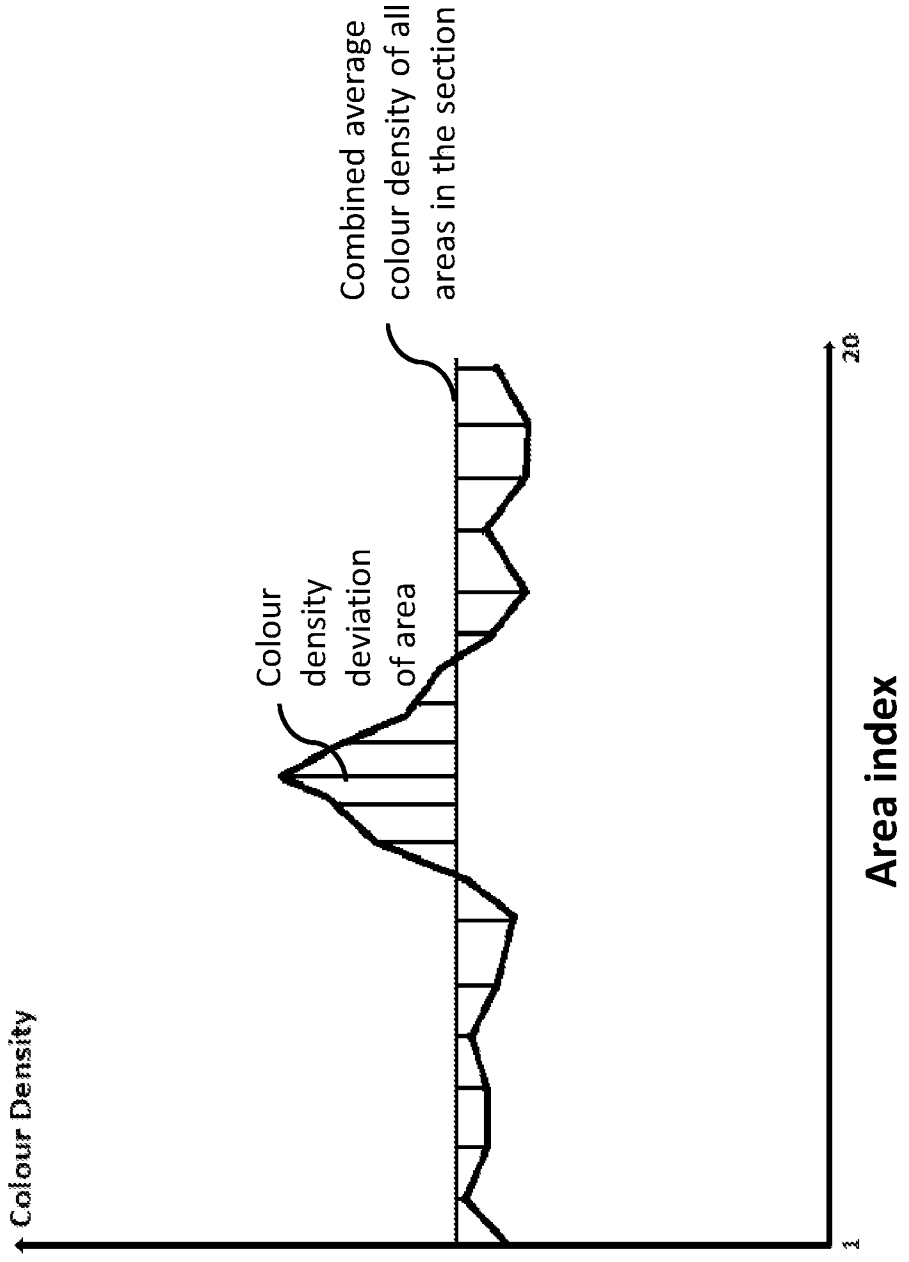
FIG. 17 is a graph of area index of areas within a section versus colour density of area and showing colour density deviation of each area.

FIG. 17 depicts a plot of area index (for e.g. Area 1, Area 2, Area 3 . . . etc. in FIG. 12) or area location of areas within the section versus colour density across area. A horizontal bar in the plot shows the combined average colour density of all the areas in the section, whereas vertical bars show colour density deviation of each area from the combined average colour density of all the areas in the section of the scanned test image.

Figure 18:
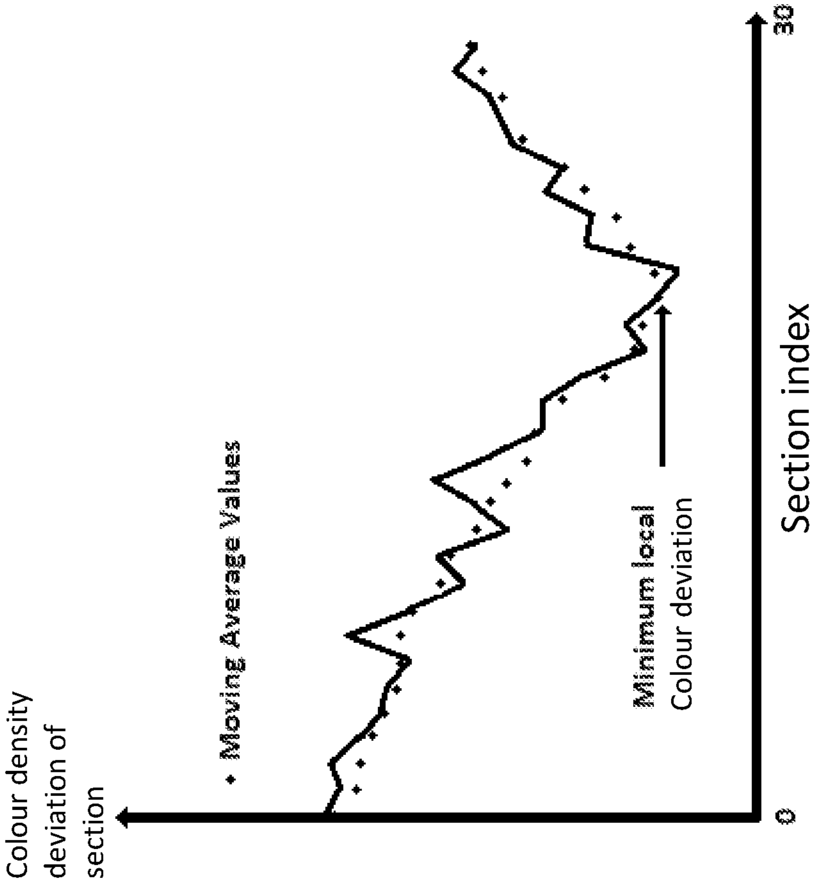
FIG. 18 is a graph of section index of sections within a test image versus colour density deviation of section.

Then, steps 1601 to 1606 are repeated for each section present in the scanned test image. Once colour density deviations in all the sections of the scanned test image have been obtained, at step S1607 local colour density deviation of each section is calculated by determining a moving average of the colour density deviation of the section and one or more neighbouring sections, preferably, with a window of at least two sections that are in the vicinity of that section. FIG. 18 depicts a plot of section index (e.g. S1, S2, S3 . . . etc. in FIG. 12) or section location of the sections within the scanned test image versus colour density deviation in the section. Dots in the plot are moving average values of the sections.

At step S1608, the local colour deviations of all the sections in the scanned test image are compared with each other and one or more best aligned nozzle pairs in the overlap region of nozzle arrays are determined based on a result of comparison. The section with the lowest or minimum local colour density deviation than the other sections in the scanned test image is selected as the best stitch section for that scanned test image. The nozzles of first and second nozzle array that are at the transition point of that section are selected as the best aligned nozzle pair. For the section with the best aligned nozzle pair, the local colour density deviation is less than that of the other sections. The determined one or more best aligned nozzle pairs may be stored in the storage of the apparatus. The moving average may help to reduce the noise in the colour density measurements. For example, some sections may appear smooth due to image defects such as blurring. Moreover, the moving average may ensure that a smooth section whose neighbouring sections are also smooth is chosen. Here, "smooth" means less or no colour density variation across the section.

Combining Results of Method 1 and Method 2

As described above, for each test image, the one or more best aligned nozzle pairs may be determined using both method 1 and method 2. The overall best aligned nozzle pair for that test image may then be calculated as the average of the results of method 1 and method 2 and the determined one or more best aligned nozzle pairs may be stored in the storage 200 of the apparatus 1.

Generally, for a given overlap region of nozzle arrays, there could be more than one best aligned nozzle pairs out of which some can be located at/near the beginning of the overlap region, some can be located at/near the middle of the overlap region, or some can be located at/near the end of the overlap region. The user can select any of the best aligned nozzle pairs; however, for better image quality, it is preferable to choose the best aligned nozzle pair which is located at/near the middle of the overlap region so as to avoid non-working nozzles which could be mainly in the beginning or end of the overlap region, and also to avoid pitch variation effect due to different nozzle pitches in the overlap region which could mainly be seen in the beginning or end of the overlap region.

The selection criteria for the preferred or primary best aligned nozzle pair from all the determined best stitch sections, may depend on three factors: (i) local colour density deviation of the section, (ii) middle offset weighting and (iii) absolute average colour deviation of all areas including stitch area in the section. For each determined best stitch section, these three factors may be multiplied together and the best stitch section with the smallest total value of multiplication may be selected as a primary stitch section, and nozzles of the first and second nozzle array that are at the transition point in that section may be selected as "primary best aligned nozzle pair". Further, at least one best stitch section with the next smaller total value of multiplication may be selected as secondary stitch section, whereas nozzles of the first and second nozzle array that are at the transition point in that section may be selected as "secondary best aligned nozzle pair".

The first factor, local colour density deviation of the section in the scanned test image, is calculated as described above in method 2.

The second factor, middle offset weighting, is the distance in area indices between each area and the central area in the test pattern of printed and scanned test image. For example, if a test pattern has 30 areas (indexed 0 to 29) and the stitch area has an area index of 5, the Middle Offset Weighting will be 9.5 (i.e. 14.5−5=9.5). This weighting may be applied as the stitch area in the best stitch section is expected to be near the centre of the test pattern of the overlap region so that the areas at the start of the test pattern will be printed by nozzles of first nozzle array, the areas at the end of the test pattern will be printed by nozzles of second nozzle array and the areas near the centre of the test pattern will be printed by a near equal number of nozzles of the first and second nozzle array, giving a more balanced stitch.

The third factor is average colour deviation of all areas including the stitch area in the section. This average colour density may be measured after the smoothing algorithm has been applied. The smoothing algorithm subtracts the background reference regions from each area. Therefore, the colour density that is measured is actually the area's deviation from the reference regions—a dark area will have a negative colour deviation and a light area will have a positive colour deviation. A section that has a bad stitch area may have a largely negative or positive average colour deviation as there will be either all dark or all light areas on either side of the bad stitch area. On the other hand, a section with a good stitch area may have an average colour deviation of approximately zero as there will be an equal number of dark and light areas on either side of the good stitch area. A section with a low absolute value of average colour density deviation from the background reference region is selected as the best stitch section, and nozzles of the first and second nozzle array that are at the transition point in that section are selected as best aligned nozzle pair.

Determining Total Skew Angle θ of the Slot in the Apparatus From the Stored Data Now, the method of determining the total skew angle θ of the slot in which a head or head module is mounted in the droplet deposition apparatus will be explained. The head module comprises a plurality of nozzles, e.g. thousands of nozzles that are arranged at a pitch of tens of microns. In the overlapping arrangement of head modules, each overlap region contains at least 20-100 nozzles. Generally, a test image is printed and visually analysed to determine one or more best aligned nozzle pairs in each overlap region. However, printing of a test image which comprises a number of test patterns of an entire overlap region and then visually analysing those different test patterns is a tedious and time consuming task, as each combination of nozzle pair (transition point) in the overlap region will have a corresponding test pattern. For example, there may be 50 test patterns in a test image for 50 nozzle pairs in the overlap region. However, with the above described methods of the present invention, as the table of best aligned nozzle pairs (as shown in FIG. 8) for the head modules 101A, 101B of head 101 is already stored in the storage 200, or the data of the actual positions or error in positions of each head module (not shown in Figures) are already stored in storage and based on that the table of best aligned nozzle pairs for the head modules can be determined and the table can be stored in the storage, when the head modules 101A, 101B i.e. head 101 is mounted in the droplet deposition apparatus 1, there is no need to print the test image with all combinations of test patterns and using all nozzles in the overlap region. Instead, the test image may be printed of test patterns of only predetermined best aligned nozzle pairs that were determined and/or stored at the factory level and/or at the printer manufacturer site or during assembly, and are selected from the table, which in turn may be used to determine the total skew angle θ of the slot in the droplet deposition apparatus (e.g. printer), thus making the process quick and efficient. The total skew angle θ of the slot may comprise at least skew angle $\theta_1$ of head 101 and skew angle $\theta_4$, i.e. total skew angle θ of the slot=$\theta_1\theta_4$.

Figure 19:
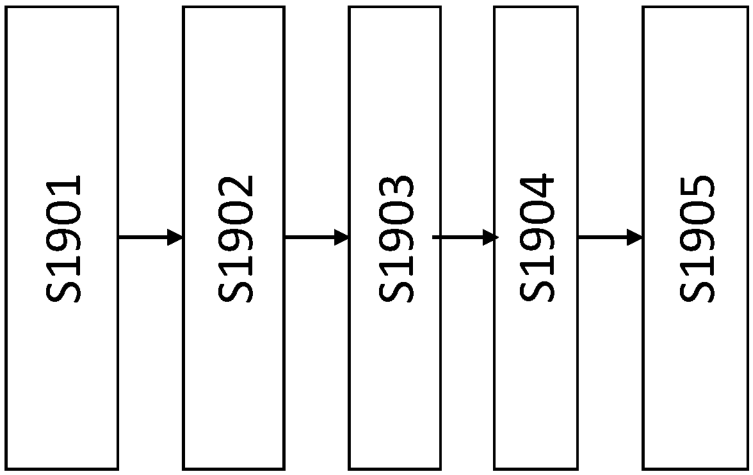
FIG. 19 is a flowchart of a method for determining skew information related to a droplet deposition apparatus.

When at least two of the head modules 101A, 101B, 102A, 102B of heads 101, 102 are mounted in the droplet deposition apparatus 1, the method according to FIG. 19 is carried out. At step S1901, the first head module 101A and the second head module 101B i.e. head 101 is mounted in the droplet deposition apparatus 1, then at step S1902 a table is retrieved from the storage 200. The table comprises predetermined best aligned nozzle pairs of head modules 101A, 101B and the corresponding skew angle of head 101 relative to a datum of the droplet deposition apparatus 1. The best aligned nozzle pairs stored in the table are dependent on the skew angle of head 101 with respect to the reference mounting apparatus, irrespective of where the head is mounted. Therefore, even if head 101 itself does not have any skew angle with respect to the apparatus 1 or mounting system, when such head 101 is mounted in the droplet deposition apparatus 1, the best aligned nozzle pair in the overlap region of head modules 101A, 101B will depend on other skews (for example, $\theta_4$) contributing to the total skew angle (as shown in FIG. 6) in the apparatus 1. These skew angles may be in the same range as the skew angles that are present in the table of FIG. 8. Hence, the same table as shown in FIG. 8 can be used to determine the total skew angle θ from the predetermined best aligned nozzle pairs.

FIG. 20 depicts essentially the same table as FIG. 8 but with the columns reversed. The aligned nozzle pairs are shown in columns 1 and 2 instead of columns 2 and 3, and skew angles $\theta_1$ shown as total skew angle θ of the slot (which is combination of $\theta_1$ and $\theta_4$) is in the column 3 instead of column 1 of the table. At step S1903, a test image having test patterns is generated for (only) all the predetermined best aligned nozzle pairs in the table of FIG. 20 (for the example table shown in FIG. 20, there will be 11 test patterns in a test image for a pixel offset) and at step S1904, the generated test image is printed. After the visual or electronic analysis of the printed test image, the best aligned nozzle pair is determined. Then, at step S1905, a total skew angle θ of the slot in the droplet deposition apparatus 1 is determined based on the best aligned nozzle pair in the printed test image and the corresponding (total) skew angle θ for that best aligned nozzle pair in the table of FIG. 20. For example, if the nozzle pair of nozzle number 1403 of module 101A and nozzle number 1459 of module 101B best align or sufficiently well align with each other in the printed test image such that there is least or no visual artefact or colour density variation in the printed test image, it is determined that the corresponding angle in table of FIG. 20 i.e. −0.03 degrees is the total skew angle θ of the slot in the apparatus 1.

The determined total skew angle θ may encompass various skew angles, i.e. $\theta_1$, $\theta_2$, $\theta_3$ and $\theta_4$ (shown in FIG. 6). The total skew angle θ in the droplet deposition apparatus 1 may be stored in the storage 200 of the droplet deposition apparatus 1.

Once the total skew angle θ in the droplet deposition apparatus 1 is determined, there is no need to generate or print further test images when a further head module is mounted in the droplet deposition apparatus 1 or when a head module 101A, 101B or head 101 is replaced. Based on the total skew angle θ of the slot which corresponds to $\theta_1$ stored in the storage 200 of the further or replaced head module, a corresponding best aligned nozzle pair can be selected from the table that is stored in the storage 200 of the further or replaced head module. The droplet deposition apparatus 1 may have one or more head modules 101A, 101B, 102A, 102B or one or more heads 101, 102, and the table of predetermined best aligned nozzle pairs and corresponding skew angles $\theta_1$ of each head module 101A, 101B, 102A, 102B or each head 101, 102 may be stored in the storage 200 of that head module 101A, 101B, 102A, 102B or head 101, 102. Therefore, when a further head module or head or a replacement head module or head is mounted in the droplet deposition apparatus 1, the total skew angle θ (corresponding to $\theta_1$) of the slot in the droplet deposition apparatus 1 is used to select the best aligned nozzle pair for the further head module or head or for the replacement head module or head from a table for the further head module or head or for the replacement head module or head without reliance on printing a further test image.

Determining Δx for Droplet Deposition Head

From all of the above methods, angular skew of one or more head modules 101A, 101B and total angular skew θ of the slot in the droplet deposition apparatus 1 can be determined using the stored actual position or error in position of each head module or using the stored table of best aligned nozzle pairs. However, along with the angular skew, it is also necessary to determine and mitigate positional offset Δx of one head module with respect to the other adjacent head module, or Δx of one head with respect to the other adjacent head, so as to further avoid or reduce visual artefacts in the printed image. Positional offset Δx can cause droplet placement errors which may lead to light or dark bands in the printed image, depending on the type of the positional offset Δx. Positive Δx (i.e. +Δx) produces a light band whereas negative Δx (i.e. −Δx) produces a dark band in the printed image.

Figure 21:
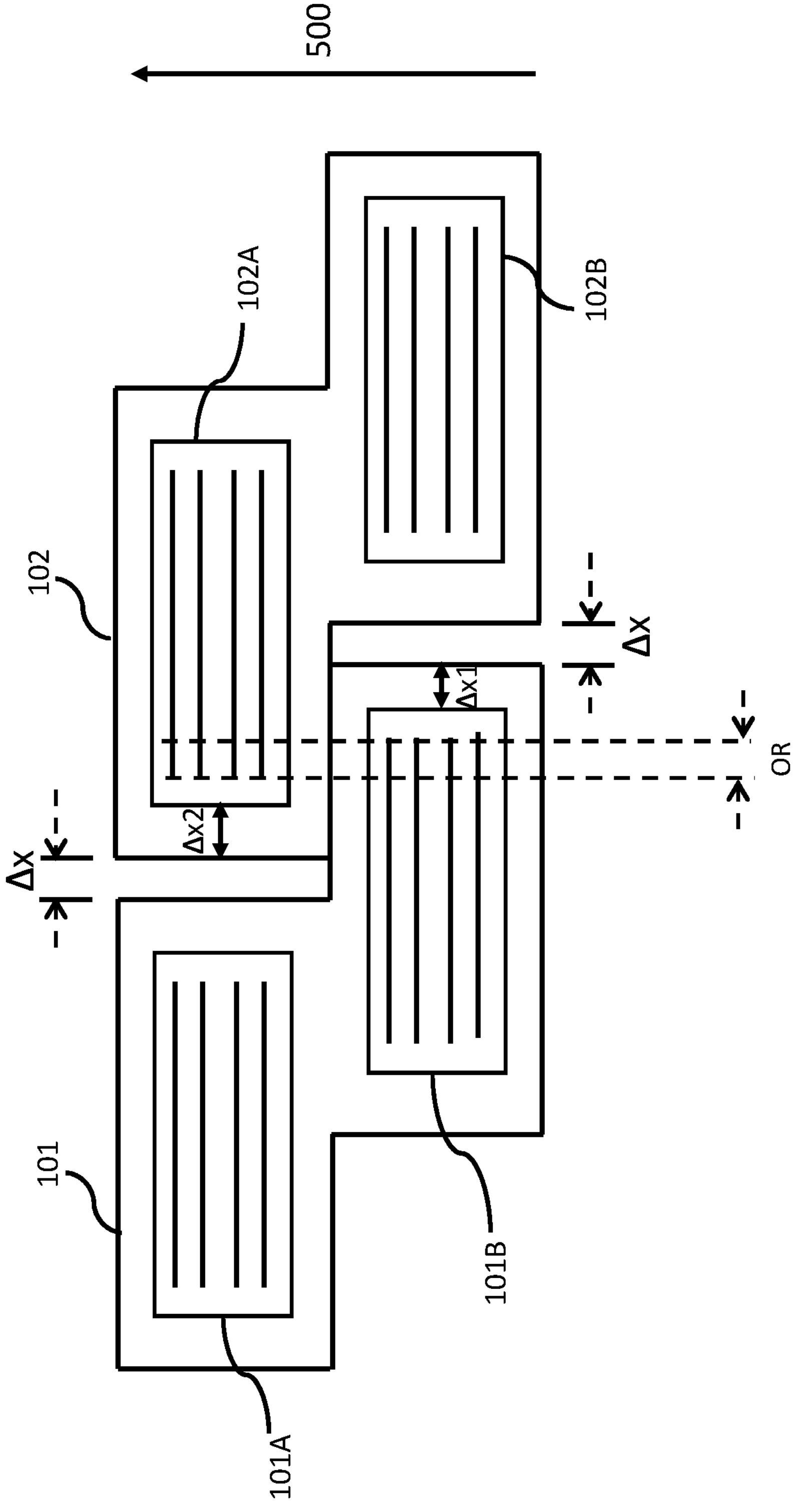
FIG. 21 depicts positional offset between a first and second droplet deposition head.

FIG. 21 shows the positional offset between adjacent droplet deposition heads 101, 102, each head comprising two head modules. Here, the head 101 may be considered as a reference head and positional offset of head 102 with respect to head 101 is calculated. To determine the positional offset, for one value of positional offset, the test image of the overlap region "OR" between head modules 101B and 102A is generated and printed. Then, the best aligned nozzle pairs in the overlap region are determined by analysing the printed image manually by visual inspection, or by using any of the abovementioned electronic methods for determining best aligned nozzle pairs. This procedure may be repeated for a plurality of positional offsets of head 102 with respect to head 101, and a table of plurality of positional offsets of head 102 and corresponding best aligned nozzle pairs may then be stored in the storage 200 of the droplet deposition apparatus 1 for future use, such as while mounting the heads 101, 102 in the droplet deposition apparatus 1.

Further, as shown in FIG. 21, the positional offset Δx1 of head module 101B with respect to head 101, and the positional offset Δx2 of head module 102A with respect to head 102, may be considered while determining the positional offset Δx of head 102.

Even though FIG. 21 describes the positional offset between two adjacent droplet deposition heads, it is applicable to the positional offset between two adjacent head modules. The storage 200 may be configured to store at least two best aligned pairs for each positional offset of the second head module 101B, 102B relative to the first head module 101A, 102A. When the head module 101B, 102B is mounted in the apparatus 1, positional offset is determined based on the stored table by printing and analysing the test image of only the stored predetermined best aligned nozzle pairs.

When at least two of the head modules 101A, 101B, 102A, 102B are mounted in the droplet deposition apparatus 1, a table is retrieved from the storage 200. The table comprises predetermined best aligned nozzle pairs and corresponding positional offset of the second head module 101B, 102B relative to the first head module 101A, 102A. Next, a test image having test patterns is generated for (only) all the predetermined best aligned nozzle pairs in the table and the generated test image is printed. After the visual or electronic analysis of the printed test image, the best aligned nozzle pair is determined. A positional offset of the second head module 101B, 102B relative to the first head module 101A, 102A in the droplet deposition apparatus is determined based on the best aligned nozzle pair in the printed test image and the corresponding positional offset for that best aligned nozzle pair in the table.

Relative Skews

The best aligned nozzle pairs in the overlap region of two droplet deposition heads 101, 102 depend on various relative skews. These various relative skews in FIG. 21 are: positional offset Δx of head 101, positional offset Δx1 of head module 101B, positional offset Δx of head 102, positional offset Δx2 of head module 102A, angular skew $\theta_1$ of head 101 (shown in FIG. 6), angular skew $\theta_2$ of head module 101B (not shown), angular skew $\theta_1$ of head 102 (not shown) and angular skew $\theta_2$ of head module 102A (not shown). All these skews depend on each other, and if one of the skews is not known, it can be calculated from the remaining skews. The best aligned nozzle pairs in the overlap region of heads 101, 102 are a function of these relative skews. Here, head 101 may be considered as the reference head and hence, the positional offset Δx of head 101 may be considered as zero so as to calculate other relative skews. In one example, positional offset Δx of head 102 may be determined using Δx of head 102, Δx1, Δx2, $\theta_1$ of head 101, $\theta_2$ of head module 101B, $\theta_1$ of head 102 and $\theta_2$ of head module 102A. The determined value of skew can be stored in the storage 200 for future use.

Controller

Figure 22:
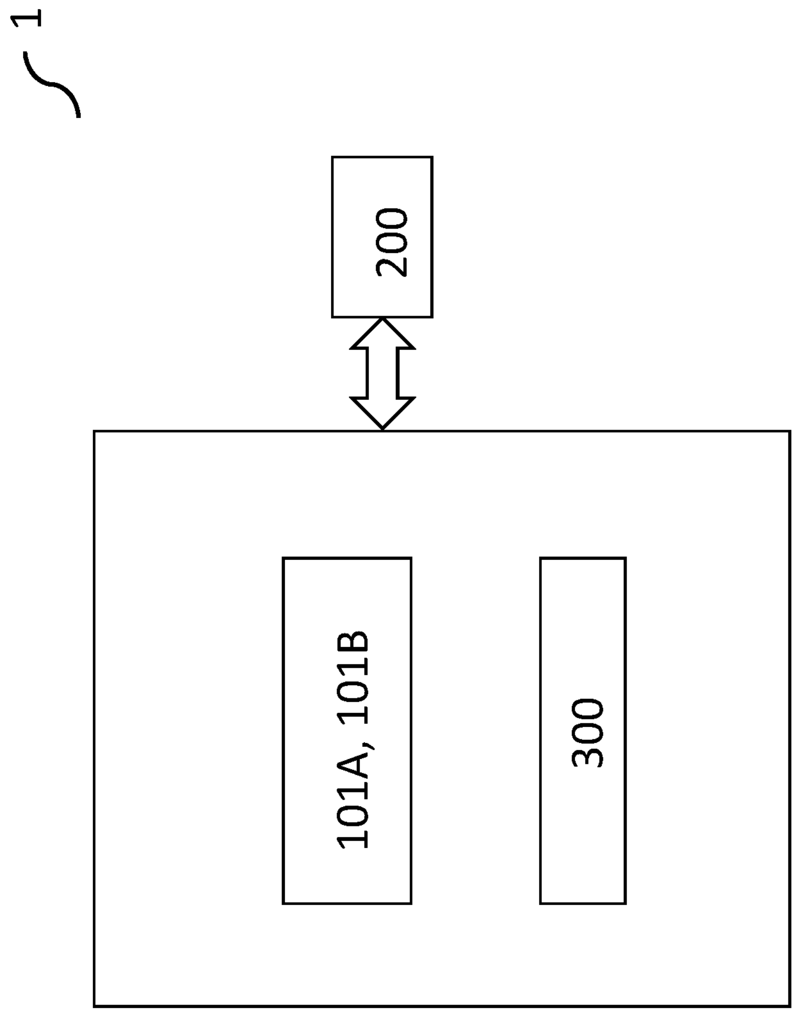
FIG. 22 is a block diagram of a droplet deposition apparatus according to the present invention, further comprising a controller.

As shown in FIG. 22, the droplet deposition apparatus 1 may further comprise a controller 300 to control the functioning of various components of the droplet deposition apparatus and to control the printing by a plurality of nozzles of first and second nozzle array. The controller 300 may be configured to generate the test image having one or more test patterns and may be configured to determine the total skew angle θ in the apparatus 1 based on the best aligned nozzle pair in the printed test image and the corresponding skew angle in the table. The controller 300 may further be configured to use the total skew angle θ to select the best aligned nozzle pair for the third head module 102A and the fourth head module 102B from the table stored in the storage for at least one of the third or fourth head module 102A, 102B, or the controller 300 may be configured to use the total skew angle θ to select the best aligned nozzle pair for the replaced head module from the table stored in the storage for the replaced head module.

Furthermore, the controller 300 may be configured to generate the test image having one or more test patterns and may be configured to determine the positional offset Δx of the second head module with respect to the adjacent or first head module based on the best aligned nozzle pair in the printed test image and the corresponding positional offset Δx in the table.

Based on the best aligned nozzle pair, the controller 300 may disable or enable appropriate nozzles from the nozzle arrays of head modules or heads. Preferably, the total number of nozzles disabled between the first head module and the second head module is the same for all stitch areas in a given overlap region between the two modules. For example, if there are 56 nozzles in the overlap region, the test image with zero pixel offset may have 28 nozzles disabled between the nozzle arrays of both head modules for each stitch area present in the overlap region. For the test images with +3, +2 and +1 pixel offset, there may be a total of 25, 26 and 27 nozzles disabled respectively between the nozzle arrays of both head modules, and for the test images with −3, −2 and −1 pixel offset, there may be a total of 29, 30 and 31 nozzles disabled respectively between the nozzle arrays of both head modules. In case there is misalignment between different components of the droplet deposition apparatus 1, for example misalignment between the droplet deposition head mounting system 100 and the droplet deposition head 101, 102, and/or misalignment between two or more droplet deposition heads 101, 102, etc., the number of disabled nozzles may be increased based on the best aligned nozzle pair or based on the best stitch area found (the one providing the lowest colour density variation transverse to the printing direction).

It should be noted that the number of disabled or enabled nozzles may be different for each set of overlapped modules. That is, if the first and second head modules 101A, 101B are overlapped, the number of disabled nozzles of the first head module 101A may be different to the number of disabled nozzles of the second head module 101B. This number may depend on the position of the stitch area or the position of the best aligned nozzle pair in the overlap region.

The controller 300 may further be configured to compensate for the total skew angle and/or positional offset within the droplet deposition apparatus 1. The controller 300 may use various methods of compensation of the skew angle and/or positional offset, for example, controller 300 may control the nozzle firing of each head module 101A, 101B, 102A, 102B based on the total skew angle θ and/or positional offset Δx, so as to adjust the timing of droplet ejection to compensate for landing position differences due to the skew angle θ and/or positional skew Δx. The controller 300 may also be configured to generate one or more masking patterns based on the total skew angle θ and/or positional offset Δx.

The controller 300 may be a computing device, a microprocessor, an application-specific integrated circuit (ASIC), or any other suitable device to control the one or more flow devices. The controller 300 may be a separate control board or may be a part of the control circuitry of the apparatus 1 that may be configured to control the functions of various components of the apparatus 1.

The present disclosure also provides a computer program comprising instructions which, when the program is executed by a computing device as outlined above, cause the computing device to function as the controller 300 and to carry out any of the methods described herein.

General Considerations

In the above disclosure, "droplet deposition head" and "head" are used interchangeably, as are "droplet deposition apparatus" and "apparatus", "nozzle array" and "array", "droplet deposition head mounting system" and "mounting system", and "stitch" and "stitch area".

It should be appreciated that, for ease of understanding, a droplet deposition head having two head modules or four head modules has been depicted in the Figures, and the invention has been described with respect to the droplet deposition head having two head modules. However, the invention is not limited to this, and any number of overlapped head modules as required can be envisaged. It is equally applicable to overlapped droplet deposition heads comprising one or more head modules, or to overlapped head modules.

It should be noted that, even though the above description refers to storing, in the storage, the actual positions and/or error in positions of two or more head modules, and storing, in the storage, the table of determined best aligned nozzle pairs in an overlap region between the nozzle arrays of first head module and the second head module, and corresponding skew angles of at least one of the head modules relative to a datum of the droplet deposition apparatus and/or corresponding positional offset of the second head module relative to the first head module, the invention is not limited to this. Indeed, the storage may store only the actual positions and/or error in positions of two or more the head modules, or may store only the table of determined best aligned nozzle pairs and corresponding skew angles and/or corresponding positional offset.

It should be noted that, even though one type of test pattern has been depicted in the Figures, the invention is not limited to this, and any other type of test pattern including any form of individual patterns such as lines or dots, as required by the user, can be used.

The invention claimed is:

1. A droplet deposition apparatus comprising:

a first head module and a second head module arranged in at least partially overlapping relationship, each head module having a plurality of nozzles in at least one nozzle array; and a storage configured to store a table of determined best aligned nozzle pairs in an overlap region and at least one of: corresponding skew angles of at least one of the head modules relative to a datum of the droplet deposition apparatus, a corresponding positional offset of the first head module relative to the second head module, or a corresponding positional offset of the first head module relative to a datum of the droplet deposition apparatus, and combinations thereof;

wherein, in the overlap region, nozzles of the first head module are arranged at a first nozzle pitch and nozzles of the second head module are arranged at a second nozzle pitch; and wherein the storage is configured to store at least two best aligned pairs in the overlap region of the first head module and the second head module, for each skew angle of at least one of the head modules.

2. The droplet deposition apparatus according to claim 1, wherein the nozzle array of the first head module and the nozzle array of the second head module each comprises a first portion in which the nozzles are arranged at a first nozzle pitch and a second portion in which the nozzles are arranged at a second nozzle pitch.

3. The droplet deposition apparatus according to claim 2, wherein the second portion of the first head module is configured to overlap with the first portion of the second head module.

4. The droplet deposition apparatus according to claim 2, wherein the nozzle array of the first head module and the nozzle array of the second head module each further comprises a third portion in which nozzles are arranged at a third nozzle pitch.

5. The droplet deposition apparatus according to claim 1, wherein the storage is configured to store at least two best aligned pairs for each positional offset of the first head module relative to the second head module or for each positional offset of the first head module relative to the datum of the droplet deposition apparatus.

6. The droplet deposition apparatus according to claim 1, further configured to store a total skew angle in the droplet deposition apparatus.

7. The droplet deposition apparatus according to claim 6, wherein the total skew angle in the droplet deposition apparatus comprises at least a combination of:

skew angle of the first and second head modules relative to a droplet deposition head, wherein the droplet deposition head comprises the first head module and the second head module, skew angle of at least one of the head modules relative to a module mounting system, skew angle of the first head module relative to the second head module, skew angle of the module mounting system relative to a datum of the droplet deposition apparatus, skew angle of a media, skew angle of a media holding mechanism relative to the media, and skew angle of the media holding mechanism relative to a datum droplet deposition apparatus.

8. The droplet deposition apparatus according to claim 6, further comprising:

a controller configured to generate a test image and configured to determine the total skew angle and/or the positional offset in the apparatus based on the best aligned nozzle pair in the printed test image and the corresponding skew angle and/or the corresponding positional offset in the table.

9. The droplet deposition apparatus according to claim 8, further comprising a third head module and a fourth head module, and wherein the controller is further configured:

to use the total skew angle to select the best aligned nozzle pair for the third head module and the fourth head module from a table stored in the storage for at least one of the third or fourth head module; or to use the total skew angle to select the best aligned nozzle pair for a replaced head module from a table stored in the storage for the replaced head module.

10. The droplet deposition apparatus according to claim 8, wherein the controller is further configured to compensate for the total skew angle and/or the positional offset within the droplet deposition apparatus.

11. The droplet deposition apparatus according to claim 1, wherein the storage is further configured to store actual positions and/or error in positions of two or more head modules in the droplet deposition apparatus.

12. A controller configured to carry out a method for determining misalignment information in respect of the droplet deposition apparatus according to claim 1, wherein the method comprises the steps of:

determining one or more best aligned nozzle pairs in an overlap region of the nozzle array of the first head module and the nozzle array of the second head module, for at least one of: a plurality of skew angles of at least one of the head modules relative to a datum of the droplet deposition apparatus, a plurality of positional offsets of the first head module relative to the second head module, or a plurality of positional offsets of the first head module relative to a datum of the droplet deposition apparatus, and combinations thereof; and storing a table of determined best aligned nozzle pairs and corresponding skew angles, and corresponding positional offset in the storage, or combinations thereof.

13. A droplet deposition apparatus comprising:

a droplet deposition head comprising a first head module and a second head module arranged in at least partially overlapping relationship, each head module having a plurality of nozzles in at least one nozzle array; and a storage configured to store a table of determined best aligned nozzle pairs in an overlap region and at least one of: corresponding skew angles of the droplet deposition head relative to a datum of the droplet deposition apparatus, or a corresponding positional offset of the droplet deposition head relative to a datum of the droplet deposition apparatus, and combinations thereof;

wherein, in the overlap region, nozzles of the first head module are arranged at a first nozzle pitch and nozzles of the second head module are arranged at a second nozzle pitch; and wherein the storage is configured to store at least two best aligned pairs in the overlap region of the first head module and the second head module, for each skew angle of at least one of the head modules.

14. The droplet deposition apparatus according to claim 13, further configured to store at least one of: actual positions, or error in positions of the first head module and the second head module, and combinations thereof;

wherein the error in position is a difference between an ideal position of the head module and the actual position of that head module.

15. A droplet deposition apparatus comprising:

a first head module and a second head module arranged in at least partially overlapping relationship, each head module having a plurality of nozzles in at least one nozzle array, and wherein, in an overlap region, nozzles of the first head module are arranged at a first nozzle pitch and nozzles of the second head module are arranged at a second nozzle pitch; and a storage configured to store at least one of: actual positions, or error in positions of two or more head modules in the droplet deposition apparatus, and combinations thereof;

wherein the error in position is a difference between an ideal position of the head module and the actual position of that head module; and wherein the droplet deposition apparatus is further configured to store a table of determined best aligned nozzle pairs in the overlap region and corresponding skew angles of at least one of the head modules relative to a datum of the droplet deposition apparatus.

16. The droplet deposition apparatus according to claim 15, comprising a droplet deposition head comprising the first head module and the second head module.

17. The droplet deposition apparatus according to claim 15, further configured to determine at least one of: one or more best aligned nozzle pairs in the overlap region of the first head module and the second head module, based on the stored actual positions, or error in positions of the head modules, and combinations thereof.

18. The droplet deposition apparatus according to claim 15, further configured to store, in the table, for each of the determined best aligned nozzle pairs in the overlap region, a corresponding positional offset of the first head module relative to the second head module or relative to the datum of the droplet deposition apparatus.

* * * * *